United States Patent
Maeda et al.

(10) Patent No.: US 6,422,516 B1
(45) Date of Patent: Jul. 23, 2002

(54) ARTIFICIAL SATELLITE WITH AN ORBIT HAVING A LONG STAYING TIME IN A ZENITH DIRECTION, AN ORBIT CONTROL METHOD AND A COMMUNICATION SYSTEM THEREWITH

(75) Inventors: Toshihide Maeda, Sagamihara; Nobuo Hamano; Shigeki Nakamura, both of Tokyo; Tomiharu Yoshida, Hitachinaka; Masataka Owada; Masahiko Ikeda, both of Hitachi; Takashi Yabutani, Hitachinaka; Masahiro Ito, Shimizu, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/672,061

(22) Filed: Sep. 29, 2000

Related U.S. Application Data

(62) Division of application No. 09/081,551, filed on May 20, 1998, now Pat. No. 6,352,222.

(30) Foreign Application Priority Data

May 21, 1997 (JP) .............................................. 9-131216
Jun. 20, 1997 (JP) .............................................. 9-164296

(51) Int. Cl.[7] .................................................. B64G 1/00
(52) U.S. Cl. ...................... 244/158 R; 701/13; 455/427; 455/429; 455/430
(58) Field of Search ...................... 244/158 R; 701/13; 455/427, 428, 429, 430, 12.1

(56) References Cited

U.S. PATENT DOCUMENTS 4,827,421 A * 5/1989 Dondl ......................... 364/459
4,943,808 A * 7/1990 Dulck et al. ................. 342/356
5,400,336 A   3/1995 Boyer et al. ............. 244/158 R
5,553,816 A * 9/1996 Perrotta ................... 244/158 R

FOREIGN PATENT DOCUMENTS

| JP | 61-144139 | 7/1986 |
|---|---|---|
| JP | 62-219727 | 9/1987 |
| JP | 1-176966 | 7/1989 |
| JP | 1-272235 | 10/1989 |
| JP | 2-128996 | 5/1990 |
| JP | 5-268131 | 10/1993 |

OTHER PUBLICATIONS

*Document Bibliography and Abstract*, JP61144139.
*Document Bibliography and Abstract*, JP2128996.
*Document Bibliography and Abstract*, JP1176966.

* cited by examiner

*Primary Examiner*—J. Woodrow Eldred
(74) *Attorney, Agent, or Firm*—Antonelli, Terry, Stout & Kraus, LLP

(57) ABSTRACT

A system and method for a group of artificial satellites. The artificial satellite is placed into an orbit in which an individual satellite orbits on an elliptical orbit so that at least one of the artificial satellites is always viewable within a predefined range of operational elevational angle in a zenith direction from a service area. The group of the artificial satellites are satellites on respective different orbits obtained by combining an inclination angle and an eccentricity squared of the elliptical orbit so that a time period during which one artificial satellite of the group of artificial satellites is viewable from ground is substantially identical to a time period during which another artificial satellite of the group of the artificial satellites is viewable from ground.

25 Claims, 14 Drawing Sheets

DIRECTING TO NORTH POLE

DIRECTING TO γ VERNAL EQUINOX

FIG.8

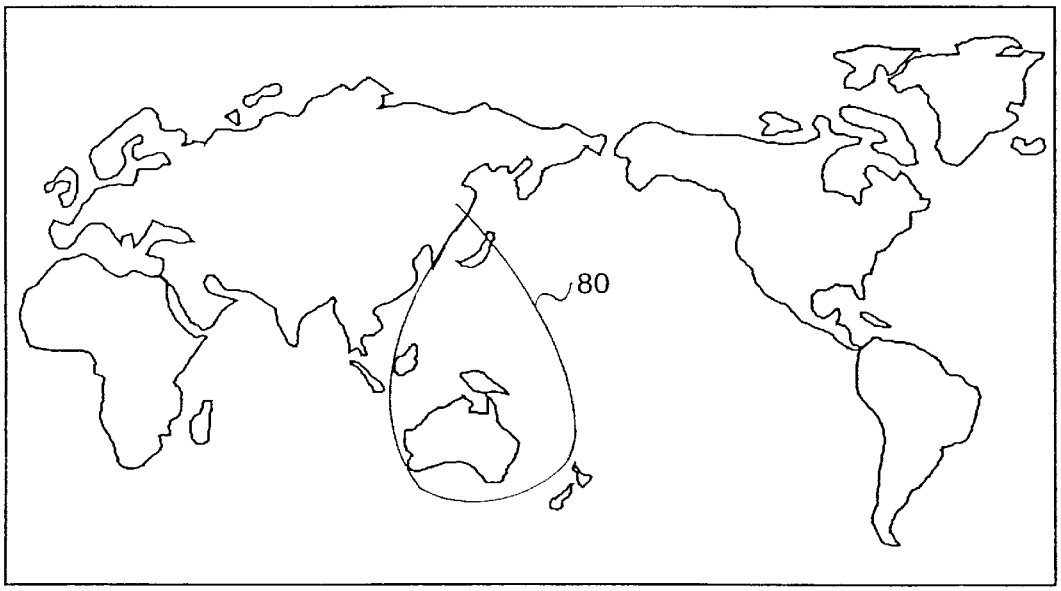

80 : MAPPING OF SATELLITE ORBIT ONTO GROUND IN WHICH ABOUT 24-HOUR CIRCUMVOLANT SATELLITE HAS ECCENTRICITY SQUARED BEING 0.25, ORBITAL INCLINATION ANGLE BEING 55 DEGREE AND PERIGEE ARGUMENT BEING 270 DEGREE

FIG.9

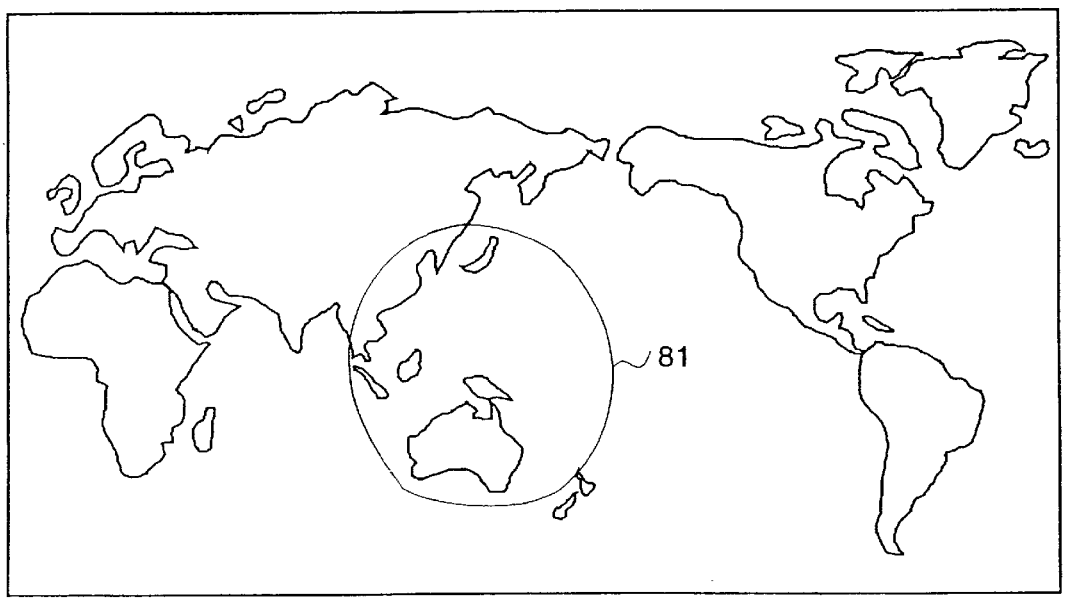

81 : MAPPING OF SATELLITE ORBIT ONTO GROUND IN WHICH ABOUT 24-HOUR CIRCUMVOLANT SATELLITE HAS ECCENTRICITY SQUARED BEING 0.38, ORBITAL INCLINATION ANGLE BEING 45 DEGREE AND PERIGEE ARGUMENT BEING 270 DEGREE

FIG. 10

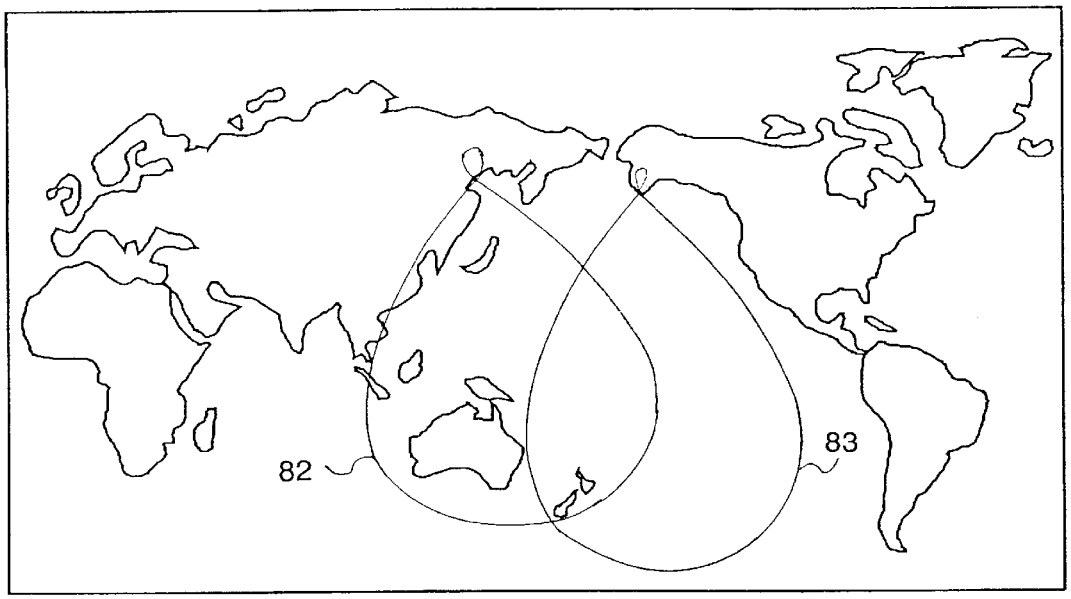

82 : MAPPING OF SATELLITE ORBIT ONTO GROUND IN WHICH ABOUT 24-HOUR CIRCUMVOLANT SATELLITE HAS ECCENTRICITY SQUARED BEING 0.35, ORBITAL INCLINATION ANGLE BEING 63.4 DEGREE AND PERIGEE ARGUMENT BEING 270 DEGREE

83 : MAPPING OF SATELLITE ORBIT ONTO GROUND IN WHICH ABOUT 24-HOUR CIRCUMVOLANT SATELLITE HAS ECCENTRICITY SQUARED, ORBITAL INCLINATION ANGLE AND PERIGEE ARQUMENT, ALL IDENTICAL TO THOSE IN SATELLITE ORBIT PROVIDING GROUND MAPPING ORBIT 87 SUCH THAT THOSE TWO GROUND-MAPPING ORBITS OVERLAPS EACH OTHER BY ADJUSTING RIGHT ASCENSION OF NORTH-BOUND NODE

ARTIFICIAL SATELLITE WITH AN ORBIT HAVING A LONG STAYING TIME IN A ZENITH DIRECTION, AN ORBIT CONTROL METHOD AND A COMMUNICATION SYSTEM THEREWITH

CROSS REFERENCE TO RELATED APPLICATION

This is a divisional of U.S. application Ser. No. 09/081,551, filed May 20, 1998, now U.S. Pat. No. 6,352,222, the subject matter of which is incorporated by reference herein.

BACKGROUND OF THE INVENTION

The present invention relates specifically to an artificial satellite, which is usable in the field of communications, such as satellite communications and mobile communications, a satellite orbit control method and a communication system using the satellite.

There is a requirement to transfer medical information including image data, for an emergency case carried on an ambulance from the ambulance to a paramedic center, and to direct medical treatment suitable for the emergency case to the ambulance from the doctors on duty at the paramedic center.

However, in the case of trying to transfer large-sized data, like image files, satisfactory results can not obtained by the conventional ground-base communication infrastructure. In addition, in case of communicating via geostationary satellites currently in service and/or mobile communication satellites to be deployed in the future, it is difficult to establish stable and continuous transfer lines extended from moving bodies because of shielding objects such as building structures and trees.

Though it is certainly possible to transfer large-sized data from movable objects, like an automobile, by using satellites moving in a specific orbit, no definite method for defining such an orbit has been established to date. Therefore, the orbit-related elements of such a specific orbit have not been definitely identified as yet.

Conventional technologies and their problems are described below in detail.

(A) Technologies and Problems in Existing Communication Infrastructures

(A-1) Technologies and Problems in Ground-base Communication Infrastructures In a case where large-sized data, like image files, are transferred from the movable bodies like automobile to a ground-base fixed station, communication methods via ground-base communication infrastructures or communication satellites can be considered. However, existing communication methods may not satisfy all the requirements for the system specification and performance.

Now, let's take as an example an ambulance. For carrying an emergency case by ambulance, the average carrying time period is about 27 minutes. For serious cases, there occurs many instances in which the emergency case may die if adequate medical treatment is not applied in time, which is a strong motivation for the medical specialist to apply medical treatment to the emergency case in the ambulance or to suggest an adequate method for medical treatment to the emergency case to the emergency medical technician in the ambulance. However, about 15,000 or more medical doctors would be required for paramedic services in order to dispatch medical doctors with shift work to the about 5,000 ambulances in Japan. However, this is not realistic, and so it is considered to be more effective to communicate adequate methods for medical treatment from the paramedic center to the ambulance. However, in the conventional ground-base communication systems, communication lines with phone-level quality with which an instantaneous break may occur frequently are only available, and therefore, adequate methods for the medical treatment can not be directed satisfactorily from the paramedic center. If image information captured by endoscope, electrocardiogram, echo and camera could be directly transferred to the paramedic center, it is supposed that satisfactory diagnosis and directions for medical treatment of the emergency case could be given. However, ground-base communication infrastructures have such problems as limitation of transmission band, limitation of communication coverage areas, cross talk and interference due to reflection by man-made building structures, and so can not be applied to practical use for such a purpose.

Similarly, though many requests exist for large-scale data transmission from movable bodies, for example, live telecast of a marathon, the conventional ground-base communication infrastructure can not be used for this application.

(A-2) Technologies and Problems in a Geostationary Communication Satellite System In the field of satellite communications using artificial satellites, communication systems using geostationary satellites and low-to-middle altitude orbits are well known. There are the following problems in conventional communication satellites.

As a geostationary satellite has about a 24-hour orbit cycle almost equal to the earth's rotation cycle, the geostationary satellite can be viewed from the ground to be stationary at a point above the Equator. However, the elevation angle of such a geostationary satellite is low, for example, the elevation angle at Tokyo is at most 45 degrees even in case of good conditions. As the movable bodies in metropolitan areas move on the roads surrounded by artificial building structures and roadside trees, the lower range of the elevation angle is blocked by those obstacles, and satellite communications with geostationary satellites may be blocked. As the stationary satellites can be seen in an east-south to west-south direction, though communication lines can be established in a case where the movable body moves in a north-to-south direction and a broader visual field to the satellite can be obtained, communication lines may be blocked by building structures and roadside trees at almost any time in a day in a case where the movable body moves in an east-to-west direction, especially, in a west direction. Therefore, satellite communications using qeostationary satellites do not produce satisfactory results for service in not-plain areas, like a metropolitan area and a mountain area.

(B) Technologies and Problems of Satellite Communication Systems Currently Under R&D In the case of satellite communication systems using low-to-middle altitude orbits, such as Iridium and Odyssey currently under development for the purpose of cellular phone services using mobile communication satellites, the duration of time while the satellite in service stays within a high elevation angle range and comes in sight from the ground is generally short due to the limitation on the number of orbital planes for the satellite and the number of satellites in service. Especially, since a satellite flying on the low altitude orbit has about 90 to 100 minutes in its orbit cycle, the duration of time while the satellite stays within a high elevation angle range as viewed from the ground is as short as a few minutes. Therefore, when trying to use or apply this kind of satellite communication systems for the purpose of stable and definite communication for large-scale data, as used in the above example of an ambulance and a paramedic service system, without any influence by building structures, plants and natural topographic features over a certain extended time period, for example, more than 27 minutes, it is required to configure such a system using plural satellites which alternately may come in sight at a higher elevation angle. In this case, some thousand or more satellites are required, which causes difficulties in procuring a number of satellites, the operation thereof and launching cost reduction, and so this plan is not practical also from an economical point of view.

In the case where a higher elevation angle is required, as in the above example, conventional geostationary satellites for practical use and low-to-middle altitude satellites currently under development are not fully applicable.

(C) Technologies and Problems in a Satellite Communication System Currently Under Study For example, as found in research reports, such as "Feasibility of Mobile Communication Mission Using NonGeostationary Satellite Orbits", Technical Research Report, Japanese Electronics, Information and Communication Society, Vol. 89, No.57, satellite communication systems currently understudy are discussed. Especially, an oblong orbit having a larger eccentricity squared is proposed in some research reports including the above report.

According to Kepler's Law, an object passing around the apogee point of the orbit slows down. By defining an orbit having its apogee point located on the upper air of the target service area, the duration time during which the satellite on this orbit stays at a high elevation angle can be taken to be long enough. Therefore, it is necessary to use an oblong orbit in order to establish communication lines for a extended period of time without a communication break due to building structures, roadside trees and natural geographical conditions.

As an example of oblong orbits, the Molnia orbit having about a 12-hour orbit cycle, a perigee altitude of some hundred km and an orbital inclination angle of about 63.4 degrees has been practically used as an orbit for communication satellites and military satellites in Russian territory since the 1960's. Though this orbit is a stable orbit with its argument of perigee being fixed, and is certainly practical for service at the higher latitude locations over the Russian territory extended in a north and south direction, this orbit is not so practical for service at the lower latitude locations extended in a north and south direction, such as over Japan. Some orbits having about an 8-hour orbit cycle, about a 12-hour orbit cycle and about a 24-hour orbit cycle are proposed for the services provided in the Japanese territory. However, those proposed orbits are designed with localized optimization, and, as the orbits suitable for the north-to-south and east-to-west extension of the Japanese territory, there has not been any proposal for optimized orbits, methods for defining those orbits and definite operation technologies. This is because the design methodology for definition of a satellite orbit has been empirical in order to determine six orbit-related elements.

There are various methodologies for identifying and defining orbits, but the following six orbit-related elements are mainly used. Those are defined for an individual reference time.

Semi-Major Axis a: semi-major axis of the ellipse (noted by symbol 54 in FIG. 5),
Eccentricity Squared e: flatness of the ellipse orbital Inclination Angle I: angle defined between the orbital plane and the equational plate
Right Ascension of North-Bound Node Q: angle (shown by symbol 63 in FIG. 6) measured in the east direction from the vernal equinoctial point to the crossing point of the orbit from the northern hemisphere to the southern hemisphere with the equational plate (this crossing point shown by symbol 62 shown in FIG. 6) (0 degree$\leq \Omega \leq$360 degrees)
Argument of Perigee $\omega$: angle measured between the perigee and the right ascension of north-bound node 62 on the orbital plane (shown by symbol 63 in FIG. 6) (0 degree$\leq \omega \leq$360 degrees)
True Anomaly $\theta$: angle defined by the line connected between the perigee and the focal point of the ellipse and the line connected between the satellite and the focal point of the ellipse (shown by symbol 58 in FIG. 5) (0 degrees$\leq \theta \leq$360 degrees).

The geometrical relationship for those elements will be described with reference to FIGS. 5 and 6. The satellite 51 moves on the elliptical orbit having a focal point 50. The distance between the perigee 53 of the ellipse and the focal point 50 of the ellipse is represented by perigee radius Rp and with symbol 57 in FIG. 5. The distance between the apogee 52 of the ellipse and the focal point 50 of the ellipse is represented by apogee radius Ra and with symbol 56 in FIG. 5. Perigee radius, apogee radius, semi-major axis a represented by symbol 54 in FIG. 5, semi-minor axis b represented by symbol 55 in FIG. 5 and the eccentricity squared e have the following relations.

Rp=a(1−e)
Ra=a(1+e)
B=a(1−e$^2$) ½
e=(Ra−Rp)/(Ra+Rp)

In FIG. 6, what is shown is an example in which the earth 60 is positioned at the focal point of the elliptical orbit. The elliptical orbit crosses at the north-bound node 62 on the equational plate from the southern hemisphere to the northern hemisphere, while the perigee is positioned at the point 65 and the apogee is positioned at the point 66. The angle 64 between the equational plate 61 and the orbital plane defines the orbital inclination angle i. The right ascension of the north-bound node is defined by the angle 68 measured in the eastern direction from the vernal equinoctial point, and the argument of the perigee is defined by the angle 63 between the north-bound node 62 and the perigee 65.

Even if the semi-major axis can be specified definitely by the orbit cycle, other major parameters may be determined to be arbitrary values, such as the eccentricity squared is an arbitrary real number 0.0 or over and less than 1.0, the orbital inclination angle is an arbitrary real number 0.0 degree or over and 180 degrees or smaller, and the argument of perigee is an arbitrary real number 0.0 degree or over and 360 degrees or smaller. Thus, there may occur a situation in which a designer is forced to determine values for those parameters intuitively and/or empirically from his or her experiences.

If a satellite which can come in sight in the zenith direction for an extended period of time on the upper air of the target service area can be realized, "large-scale data transfer from mobile bodies for an extended period of time" can be established by satellite communications. Thus, what has been sought are feasible methodologies for defining orbit-related elements and their definite values which can be adaptive to Japanese territory characteristics and are cost-effective, that is, configured with less number of satellites forming the overall system.

As described above, in order to transfer large-scale data including image files from movable bodies, like an automobile, for an extended period of time, it is required to make the satellite remain on the orbit in the zenith direction as long as possible and to communicate with the satellite.

It has been generally recognized that it is preferable to establish an orbit shaped in an oblong ellipse having its apogee on the upper air of the target service area, in order to satisfy the above described requirement. However, adequate methodologies and algorithms for defining orbit-related elements have not been proposed. In addition, there is no definite proposal for specified values for those parameters to be optimized for the services over the whole Japanese land.

SUMMARY OF THE INVENTION

An object of the present invention is to provide a specific methodology for setting orbit-related parameters with respect to the above described problems, and to set the orbit-related parameters in terms of a limited range for the parameters obtained by this methodology.

Another object of the present invention is to provide various systems using artificial satellites arranged so as to be able to remain insight in the zenith direction for a long stretch of time in order to solve the above described problems.

And furthermore, another object of the present invention is to provide an orbit control means for performing the control of artificial satellite orbits based on the orbit-related parameters defined in the manner described above.

In order to achieve the above objects, in accordance with the present invention, in an artificial satellite traveling along an elliptical orbit, the elliptical orbit is defined by six orbit-related parameters obtained with input conditions, including the geographical condition of the service area to be covered by the artificial satellite, the tolerance of the ascending vertical angle within which the artificial satellite can be viewed from the service area, and the reference time defining the orbit elements.

The artificial satellite traveling on an elliptical orbit according to the present invention travels on such an oblong orbit that the artificial satellite may come in sight at an angle larger than the maximum elevation angle with which the geostationary artificial satellite is viewed from the service area corresponding to the artificial satellite.

As for the determination of orbit elements, six orbit related parameters are determined by steps including the step of setting the semi-major axis, the step of setting the perigee arguments, the step of setting the semi-vertical angle, the step of setting the desired service time, the step of setting the polygon including the service area, the step of setting the number of artificial satellites, the right ascension of the north-bound node of the individual artificial satellite and the true anomaly of the individual artificial satellite, the step of setting the initial value for the orbital inclination angle, the step of calculating the duration time for the artificial satellite coming into sight from the individual apex of the polygon, the step of setting the combination of the orbital inclination angle and the eccentricity squared and the step of resetting the right ascension of the north-bound node and true anomaly of the individual artificial satellite.

In order to achieve the above described object of the present invention, in the group of artificial satellites including plural artificial satellites traveling on elliptical orbits, six orbit-related parameters of the elliptical orbits of the individual artificial satellites are obtained with input conditions including the geographical condition of the service area to be covered by the artificial satellites, the tolerance of the ascending vertical angle within which any one of the group of artificial satellites can be viewed from the service area, and the reference time defining the orbit elements; and, what are used are a group of satellites such that one or more artificial satellites are arranged on the individual orbital planes within the predetermined range of the ascending vertical angle viewed in the zenith direction from the service area by combining plural elliptical orbits so that at least one or more artificial satellites can always come in sight.

In order to achieve the above described object of the present invention, artificial satellites with orbits provided by the present invention are used in various systems using artificial satellites, such as an orbit control system for controlling the orbit of satellites, a satellite communication system for conducting satellite communications with artificial satellites, and an earth observing system using artificial satellites carrying earth observing devices.

In case the satellite communication terminal in the satellite communication system is used within the service area covered by the artificial satellites of the present invention, the satellite communication terminal may have send/receive means for sending and receiving signals to and from the target artificial satellite coming in sight in the range of the ascending vertical angle in the predetermined zenith direction, and may be loaded on the movable body moving mainly within the service area. In addition, the satellite communication terminal may include GPS means for receiving radio waves from GPS satellites forming a global positioning system and at least for measuring the position of the satellite communication terminal itself, and may have measuring means for measuring the quantity consumed by every house to be charged for electricity, gas or public water supplied by public utility services.

In order to achieve the above described object of the present invention, in the group of artificial satellites including plural artificial satellites traveling in elliptical orbits, six orbit-related parameters of the elliptical orbits of the individual artificial satellites are obtained so as to satisfy the input conditions including the geographical condition of the service area to be covered by the artificial satellites, the tolerance of the ascending vertical angle within which any one of the group of artificial satellites can be viewed from the service area, and the reference time defining the orbit elements. In case plural artificial satellites are employed, one or more artificial satellites may be arranged on the individual orbital planes within the predetermined range of ascending vertical angle viewed in the zenith direction from the service area by combining plural elliptical orbits so that at least one or more artificial satellites can always come in sight.

The above described object is established by a orbit element determination apparatus comprising means for setting a polygon including a semi-major axis, a perigee argument, a semi-vertical angle, a service time and a service area; means for setting the number of satellite and right ascension of the north-bound node and true anomaly of the individual satellite; means for setting the initial value for the orbital inclination angle; means for calculating the duration time for the satellite coming into sight from each apex of the polygon; means for setting a combination of the orbital inclination angle and the eccentricity squared and means for resetting the right ascension of the north-bound node and the true anomaly of the individual satellite.

In order to achieve the above described object, in the satellite communication system for conducting satellite communications with artificial satellites, the present invention at least includes an artificial satellite, a satellite communication terminal for conducting satellite communications with artificial satellites and a base station for conducting communications to and from the satellite communication terminal with the artificial satellites, in which the artificial satellite is a satellite that travels on such an oblong orbit that the artificial satellite may come in sight at an angle larger than the maximum elevation angle with which the geostationary artificial satellite is viewed from the service area corresponding to the artificial satellite, and the satellite communication terminal may be loaded on a movable body and have send/receive means for sending and receiving signals to and from the target artificial satellite coming in sight in the range of the ascending vertical angle in the predetermined zenith direction when used within the service area covered by the artificial satellite.

In order to achieve the above described object, in the satellite communication system for conducting satellite communications with artificial satellites, the present invention at least has an artificial satellite and plural satellite communication terminals for conducting satellite communications with artificial satellites, in which the artificial satellite is a satellite that travels on such an oblong orbit that the artificial satellite may come in sight at an angle larger than the maximum-elevation angle with which the geostationary artificial satellite is viewed from the service area corresponding to the artificial satellite, and plural satellite communication terminals have send/receive means for sending and receiving signals to and from another satellite communication terminal, and at least one of the plural satellite communication terminals is located within the main service area, the other of the plural satellite communication terminals are located in the area outside the main service area and from which satellite communications with the artificial satellite are possible, and any one of the relay operations may be selected in response to the ascending vertical angle of the artificial satellite viewed from the main service area covered by the artificial satellite, in which relay operations include a relay operation between satellite communication terminals located within the main service area, a relay operation between the satellite communication terminal located within the main service area and the satellite communication terminal located in the other areas, and a relay operation between satellite communication terminals located in the area other than the main service area.

BRIEF DESCRIPTION OF THE DRAWINGS

FIG. 8 is a mapping diagram of the artificial satellite orbit onto the ground in which the artificial satellite has about 24-hour circumvolant flight with eccentricity squared being 0.25, orbital inclination angle being 55 degrees and perigee argument being 270 degrees, and the mappemonde is based on isometric projection with respect to latitude and longitudinal measures.

FIG. 9 is a mapping diagram of the artificial satellite orbit onto the ground in which the artificial satellite has about a 24-hour circumvolant flight with eccentricity squared being 0.38, orbital inclination angle being 45 degrees and perigee argument being 270 degrees, and the mappemonde is based on isometric projection with respect to latitude and longitudinal measures.

FIG. 10 is a map based on isometric projection with respect to latitude and longitudinal measures, which includes a ground-mapping orbit 82 of the artificial satellite with about 24-hour circumvolant flight with eccentricity squared being 0.35, orbital inclination angle being 64.4 degrees and perigee argument being 270 degrees, and a ground-mapping orbit 83 having the same orbital period, eccentricity squared, inclination angle and perigee argument as those of the ground-mapping orbit 82 in which the right ascension of a north-bound node is so defined as to obtain a ground-mapping orbit overlapping exactly the ground-mapping orbit 82.

DESCRIPTION OF THE PREFERRED EMBODIMENTS

Figure 1:
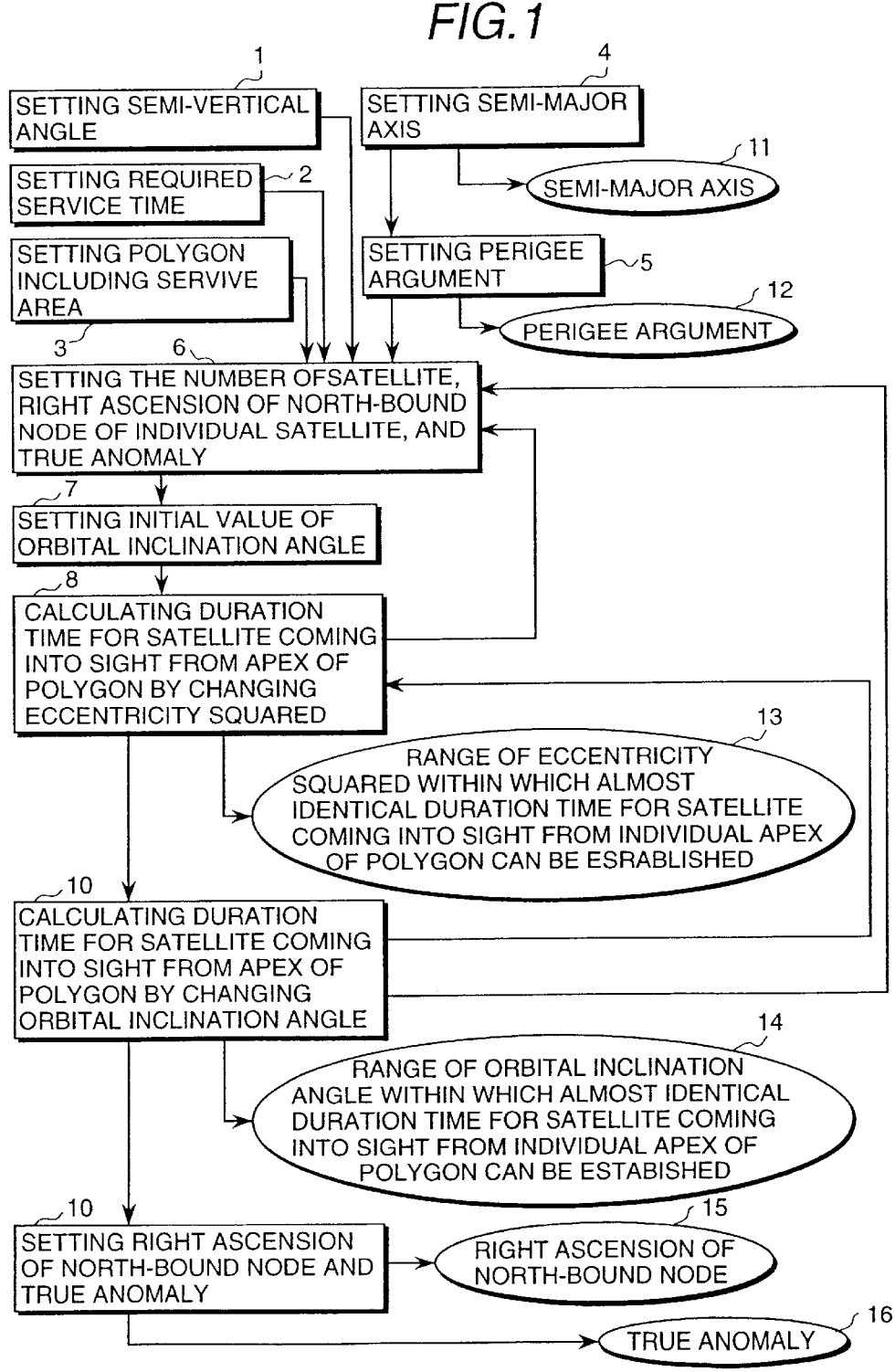
FIG. 1 is a flowchart representing the method for setting six orbit-related parameters which make it possible to sight the artificial satellite in the zenith direction over an extended time period in accordance with the present invention.

Now, embodiments related to the following items in accordance with the present invention will be described in detail below:

(a) method (algorithm) for setting optimal orbit elements;

(b) operation for setting optimal orbit elements by applying the algorithm; and (c) strategy for implementing the optimal orbit elements and controlling satellites.

(1) Method for Setting Optimal Orbit Elements (Algorithm)

In order to make an artificial satellite come in sight in the zenith direction in such a way that the artificial satellite may not be blocked from sight by man-made building structures, plants and natural topographic features, it is effective to use elliptical orbits having their apogee in the upper air of the observation area. A method for setting orbit elements will be described below. This setting method is illustrated schematically by the flowchart shown in FIG. 1.

(1-1) Setting Semi-major Axis (Step 4)

In considering the operation of the satellite itself and the operation of the satellite communication using the satellite, by using orbits on which the satellite travels with a circumvolant period equal to the product of any whole number and a time period of a single day or quotient of a time period of a single day and any whole number, an identical satellite can be made to come in sight in a designated direction at a definite time in a day, and therefore, a periodic operation of the satellite can be established. Table 1 shows the result of analysis of the duration time for the satellite coming in sight and its occurrence in a day, in which the orbital period is assumed to be one of 4, 6, 8, 12, 16, 24, 32 and 36 hours.

TABLE 1

| Cycle (Hour) | 4 | 6 | 8 | 12 | 16 | 24 | 32 | 36 |
|---|---|---|---|---|---|---|---|---|
| Sapporo | 0:25 | 1:30 | 1:40 | 6:01 | 1:51 | 8:23 | 2:25 | 2:48 |
| Sendai | 0:34 | 1:14 | 1:15 | 3:56 | 1:16 | 6:56 | 1:44 | 1:49 |
| Tokyo | 0:36 | 1:11 | 1:04 | 3:15 | 1:03 | 6:26 | 1:29 | 1:06 |
| Niigata | 0:37 | 1:15 | 1:12 | 3:49 | 1:13 | 6:53 | 1:41 | 1:32 |
| Nagoya | 0:37 | 1:11 | 1:01 | 3:05 | 0:59 | 6:20 | 1:25 | 1:07 |
| Osaka | 0:37 | 1:07 | 0:59 | 2:54 | 0:55 | 6:12 | 1:20 | 1:07 |
| Hiroshima | 0:36 | 1:01 | 0:54 | 2:37 | 0:51 | 5:57 | 1:08 | 1:09 |
| Kouchi | 0:36 | 1:01 | 0:53 | 2:34 | 0:50 | 5:54 | 1:06 | 1:06 |
| Fukuka | 0:30 | 0:52 | 0:49 | 2:16 | 0:45 | 5:38 | 0:50 | 1:08 |
| Naha | 0:17 | 0:33 | 0:30 | 0:57 | 0:23 | 3:30 | 0:43 | 0:54 |
| Visible Occurrence(/Day) | 1–2 | 1–2 | 1 | 2 | 1/2 | 2 | 1/4–1/2 | 1/3–2/3 |

Table 1 shows the duration times during which a satellite on the orbits with their orbital inclination angle being 63.4 may come in sight in the zenith direction with an elevation angle of more than 70. In terms of a system configuration, it is advantageous to select the satellites on orbits having orbital periods of 12 hours or 24 hours. Thus, what can be concluded is that the orbits specifically having orbital periods of 12 hours or 24 hours are practical even if the orbital inclination angle changes. From the period of the satellite, the semi-major axis 11 is determined uniquely to be about 26,562 km for an orbit having about a 12-hour orbital period or to be about 42,178 km for an orbit having about a 24-hour orbital period.

(1-2) Setting Perigee Argument (step 5)

The perigee argument 12 depends on the location of the service area in which the communication service or the earth observing service can be made available by using satellites. In a case where the service area is located in the Northern hemisphere, the perigee argument is determined to be about 270 degrees so that the perigee may be located in the upper air of the Northern hemisphere. In a similar manner, in a case where the service area is located in the Southern hemisphere, the perigee argument is determined to be about 90 degrees. Those conditions are necessary for locating the apogee in the upper air of the service area. (1-3) Setting eccentricity squared, orbital inclination angle, north-bound node and true anomaly.

(a) Setting Semi-vertical Angle (Step 1)

As the term "zenith direction" still represents a qualitative property, a semi-vertical angle is so defined as to be in an allowable angle range within which the satellite will come in sight, such as 20 degrees or 40 degrees. In this case, the corresponding elevation angle is 70 degrees or 50 degrees, respectively. The satellite can come in sight over an extended time period while being located within a circular cone with this semi-vertical angle extended in the central axis relative to the zenith. The smaller the semi-vertical angle, the larger will be the number of satellites required for service.

(b) Setting Required Service Time (Step 2) The duration of the service time for which the satellite service needs to be available should be defined. For example, in the case of an ambulance dispatch service, 24-hour service is required.

(c) Setting Polygon Including Service Area (Step 3)

As the conventional geostationary satellite can be seen as at a standstill in the sky, the communication to the satellite can be established by transmitting a beam between the satellite and the service area. In Iridium and Odyssey systems using low-to-middle altitude orbits, since they use a design concept wherein a number of satellites cover all the service areas on the ground, there is no need for managing the individual service areas with their own characteristics. As for the elliptical orbits to be used by the present invention, the satellites on the elliptical orbits can not be seen to be at a standstill from the ground, and hence, it is desirable that the number of satellites is small. Thus, the locus of orbits should be selected so as to be optimized for the individual service areas.

In accordance with the present invention, the latitude, longitude and elevation of four locations, including northernmost, southernmost, westernmost and easternmost portions of the service area, are defined. In case the service area is over the Japanese archipelago, the locations shown in Table 2 are considered as northernmost, southernmost, westernmost and easternmost.

TABLE 2

| Place | Location | North Latitude | South Latitude |
|---|---|---|---|
| Northernmost | Etorofu Island | 45 33.3' | 148 45.5' |
| Easternmost | Minamitorishima | 24 17.0' | 153 59.2' |
| Southernmost | Okinotorishima | 20 25.3' | 136 4.9' |
| Westernmost | Yonakunijima | 24 26.6' | 122 56.0' |

Figure 7:
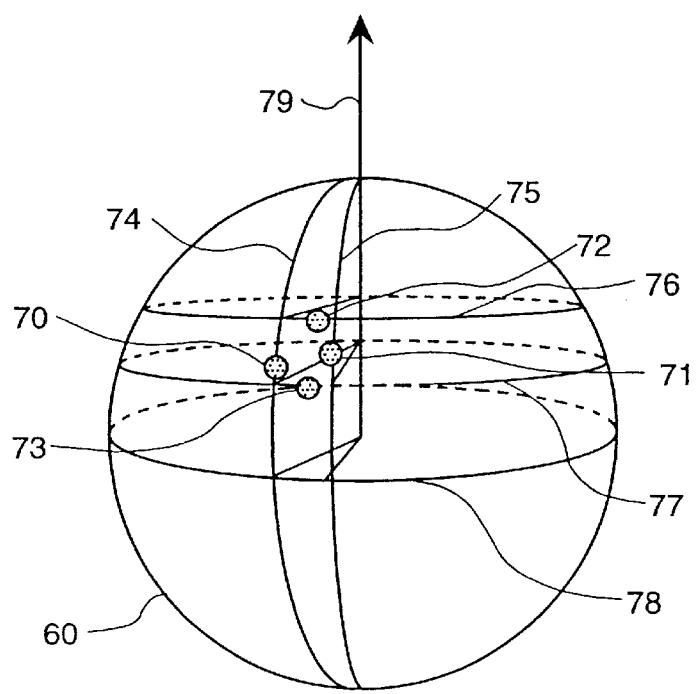
FIG. 7 is a bird's-eye view of the earth showing the necessity for setting six orbit-related parameters by considering the service area.

Those four locations are as shown in FIG. 7 and their altitude and longitude do not take an identical value generally. In case some service area is not included in a quadrangle having those locations at its corners, additional locations with their own latitude, longitude and elevation are defined so as to form such a polygon that includes all the service areas. This polygon can be formed by plural adjoining triangles.

Steps (a) to (c) can be performed in random order.

(d) Setting the Number of Satellites, the Right Ascension of the North-bound Node and a True Anomaly of an Individual Satellite (Step 6)

In a case where 24-hour service is attempted to continue with an elliptical orbit, it is apparent that a single satellite can not realize this service. Therefore, in order to use 2 or more satellites for establishing the necessary system configuration, the number of satellites to be used is defined. In order to establish a continuous service in a service area, it is effective to allocate a single satellite on a single orbital plane. In addition, it is desirable to make the shape or trajectory of the individual orbits identical. The right ascension of the north-bound node is shifted from one orbit to another orbit by an angle equal to the division of 360 degrees by the number of satellites. For example, assuming that the number of satellites is three, the individual satellites travel on the orbits with their right ascension of the north-bound node shifted by 120 degrees.

The right ascension of the north-bound node rotates with a constant interval around the earth's axis due to the gravitational potential of the earth. This means that the orbital plane rotates around the earth's axis. Therefore, it is required to define the right ascension of north-bound node at the reference time so that the apogee may be located in the upper air of the service area. In this step, it is possible to give an arbitrary value to the right ascension of the north-bound node for the convenience of analysis. In addition, it is possible to set an arbitrary value on the inertial space of the service area for the convenience of analysis.

In setting the true anomaly, in case one satellite is located at the perigee on the orbit, the true anomaly of the other satellite may be shifted by an angle corresponding to the division of the orbital period of the satellite by the number of satellites in the system. For example, in a case of three satellites, the true anomaly of the individual satellite adjacent to each other may be shifted each by an angle corresponding to 1/3 of the orbital period.

By setting the right ascension of the north-bound node and the true anomaly of the individual satellites, their orbits as mapped on the ground become identical and they come in sight on the upper air of a common area.

(e) Setting Initial Value of Orbital Inclination Angle (Step 7)

It is supposed to make it possible to provide almost uniform service in the whole service area if the apogee of the orbit is located in the upper air of the center of mass of this polygon. However, because of the movement of the position on the ground due to earth rotation and the relative movement of the satellite traveling on the orbit, this configuration of orbits is not necessarily ideal. Therefore, using an initial value for the orbital inclination angle equal to the latitude of the position near the center of mass of the polygon, the analysis is performed in the following manner.

(f) Calculating the Duration Time for a Satellite Coming into Sight from an Individual Apex of the Polygon (Steps 8 and 9)

So far, the initial values for the semi-major axis 11, the argument of perigee 12, the right ascension of the north-bound node, the true anomaly and the orbital inclination angle of the individual orbits were determined. Five elements out of six orbit-related parameters have been determined.

The duration time during which the individual satellite can be viewed from the individual apex of the polygon and within a circular cone with this semi-vertical angle extended in the central axis to the zenith is calculated for the individual satellite. This time can be obtained by geometrical computation and Repler's laws of planetary motion, or calculated by numerical calculation by computers. As shown in Step 8 of FIG. 1, by changing the eccentricity squared, from 0.0 to 1.0, the range of the eccentricity squared with which the duration times for the satellite to be viewable from all the apexes of the polygon are almost identical to one another, is calculated. In case of using computers, it is possible to use a method in which the individual duration times from the individual apexes of the polygon are compared with one another by incrementing the eccentricity squared with a definite difference.

Next, as shown in Step 9 of FIG. 1, by varying the orbital inclination angle and the eccentricity squared from their initial values, the range of the eccentricity squared, with which the duration times for the satellite to be viewable from all the apexes of the polygon are almost identical to one another, is calculated. Similarly, in the case of using computers, the individual duration times from the individual apexes of the polygon are compared with one another by incrementing the orbital inclination angle with a definite difference. By defining the reference time and fixing the right ascension of the north-bound node and the position on the inertial space of the service area, both corresponding to the reference time, and then, simulating the orbital calculation by computers in order to obtain the duration time for the satellite to be viewable, the duration time for all the satellites, during which the individual satellite can be viewed from the individual apex of the polygon and within a circular cone with this semi-vertical angle extended in the central axis to the zenith, can be obtained.

In this time, the time length during which the satellite stays within the semi-vertical angle is equivalent to the time length for which a single satellite can occupy a service for a single orbital plane. If this time length is so selected as to be a divisor of about 24 hours, that is, the earth's rotation period, for example, about 1 hour, about 2 hours, about 3 hours, about 4 hours, about 6 hours, about 8 hours, about 12 hours and about 24 hours, it is favorable for providing periodic services and satellite operations. It is necessary to use at least one satellite for providing 24-hour service, which means that the service can be continuously available all day long, and to use at least two satellites for providing 12-hour service, respectively. Therefore, if necessary, the number of satellites to be required can be defined again by going back to the above described process (d) (Step 6).

(g) Setting a Combination of the Orbital Inclination Angle and the Eccentricity Squared By repeating the analysis in Steps 8 and 9, the combination of the orbital inclination and the eccentricity squared for providing uniform services in an arbitrary position in the polygon including the service area can be obtained in terms of the numerical ranges shown in the blocks 13 and 14 of FIG. 1.

(h) Resetting the Right Ascension of the North-bound Node and the True Anomaly (step 10)

In the last step, the reference time is defined so as to be tuned to the time for launching the satellite, and the corresponding right ascension of the north-bound node 15 and the true anomaly 16 may be determined properly.

All or partial processes of the above described algorithm can be generated as programs and may be executed by computers. For example, it is possible to use a system in which, after users input the data at Steps 1 to 5, the computer executes the programs corresponding to Steps 6 to 10 in response to the input data and conditions.

(2) Setting Orbit-related Elements by the Above Described Algorithm (2-1) In Case of Defining the Service Area as in Japan By using the above described algorithm, for the service area including all the Japanese territory, an elliptical orbit having the orbit-related elements shown in Case 2 of Table 3 can be obtained as a combination of ranges of orbit-related elements so that a single satellite may come in sight for about 12 hours a day from all the Japanese territory in the zenith direction at an elevation angle of more than 55 degrees. In this case, if a couple of satellites are arranged so that their right ascensions of the north-bound node may be shifted by 180 degrees and their true anomaly may be shifted by 180 degrees corresponding to half time of the orbit cycle, the satellite can come in sight for 24 hours a day from all the Japanese territory in the zenith direction at an elevation angle of more than 55 degrees.

In case of considering the Japanese territory excluding isolated southern islands like Okinotori Island and Minamitori Island, by shifting the right ascensions of the north-bound node of four satellites individually by 90 degrees and using the elliptical orbit having the orbit-related elements shown in Case 1 of Table 3, either of four satellites can always come in sight in the zenith direction an elevation angle of more than 55 degrees.

TABLE 3

| Item | Value | |
| --- | --- | --- |
| Case ID | Case 1 | Case 2 |
| Semi-Major Axis (km) | approximately 42,178 | approximately 42,178 |
| Eccentricity Squared | approximately 0.24 or larger and approximately 0.38 or smaller | approximately 01.24 or larger and approximately 0.38 or smaller |
| Orbital Inclination Angle (degree) | approximately 35 or larger and approximately 40 or smaller, or approximately 140 or larger and approximately 155 or smaller | approximately 47 or larger and approximately 52 or smaller, or approximately 128 or larger and approximately 133 or smaller |
| Argument of Perigee (degree) | approximately 90 or approximately 270 | approximately 90 or approximately 270 |
| Right Ascension of North-Bound Node (degree) | value set in responsive to the reference time when defining orbit-related elements | value set in responsive to the reference time when defining orbit-related elements |
| True Anomaly (degree) or a position on the orbit at a specified time | value set in responsive to the reference time when defining orbit-related elements | value set in responsive to the reference time when defining orbit-related elements |

The orbit of an artificial satellite, if a short cycle or long cycle, always fluctuates under the influence of the earth's gravitational field and the attractive force of the Moon and Sun, and is controlled with some tolerance to a certain extent. For this reason, approximate values or target nominal values after orbit control are shown in the orbit-related elements mentioned in this embodiment and accompanied tables.

In a case where the orbit cycle is about 12 hours, for the locations in Hokkaido, Honshu, Shikoku, Kyushu and Okinawa, the elliptical orbits having orbit-related elements shown in Case 3 of Table 4 are obtained as a combination of orbit-related elements which enables the satellites to come insight during about 6 hours in the zenith direction at an elevation angle of more than 70 degrees.

TABLE 4

| Item Case ID | Value Case 3 |
| --- | --- |
| Semi-Major Axis (km) | approximately 26,562 |
| Eccentricity Squared | approximately 0.70 or larger and approximately 0.80 or smaller |
| Orbital Inclination Angle (degree) | approximately 30 or larger and approximately 45 or smaller, or approximately 135 or larger and approximately 150 or smaller |

TABLE 4-continued

| Item Case ID | Value Case 3 |
| --- | --- |
| Argument of Perigee (degree) | approximately 90 or approximately 270 |
| Right Ascension of North-Bound Node (degree) | value set in responsive to the reference time when defining orbit-related elements |
| True Anomaly (degree) or a position on the orbit at a specified time | value set in responsive to the reference time when defining orbit-related elements |

In the case of selecting values for the orbit-related elements to be outside the above described ranges, for example, in Case 2 where the orbit cycle is about 24 hours, there might be such a case where the satellite can not come in sight in the zenith direction at an elevation angle of more than 55 degrees at some partial areas in Japan. For example, in case the orbital inclination angle is 45 degrees or smaller, or 135 degrees or larger, the service duration time for the northernmost areas in Japan may become less than 24 hours, but, in contrast, in case the orbital inclination angle is between 55 degrees and 125 degrees, the service duration time for the southernmost areas in Japan may become less than 24 hours. In case the eccentricity squared is about 0.25 or smaller, the service duration time for the northernmost areas in Japan may become less than 24 hours; and, in case the eccentricity squared is about 0.38 or larger, the service duration time for the westernmost or easternmost areas in Japan may become less than 24 hours. FIG. 8 shows a ground-mapped trace of the orbit having about a 24-hour orbital cycle in which the eccentricity squared is 0.25, the orbital inclination angle is 55 degrees and the argument of perigee is 270 degrees. FIG. 9 shows a ground-mapped trace of the orbit having about a 24-hour orbital cycle in which the eccentricity squared is 0.38, the orbital inclination angle is 45 degrees and the argument of perigee is 270 degrees. In case the orbital inclination angle is between 0 and 90 degrees, the larger the eccentricity squared, the wider the ground-mapped orbit extends in the east and west directions. In this case, the larger the orbital inclination angle, the wider the ground-mapped orbit extends in the north and south directions. In contrast, in case the orbital inclination angle is between 90 and 180 degrees, the smaller the orbital inclination angle, the wider the ground-mapped orbit extends in the north and south directions. From ground-mapped orbits shown in FIGS. 8 and 9, it is well understood that the service can not be fully provided at the assumed positions if the values for the orbit-related elements go beyond those defined in such a manner as described above.

From the above description, the optimized ranges for the orbit-related elements for covering all service areas in Japan can be summarized in Table 5. As some examples, the service areas, tolerable elevation angles and the number of satellites to be required are additionally tabulated.

TABLE 5

| Case ID | Orbit with approximately 12-hour cycle | Orbit with approximately 24-hour cycle | | |
|---|---|---|---|---|
| | Case 3 | Case 1 | Case 2 | Case 4 |
| Semi-major Axis (km) | approximately 26,562 | approximately 42,178 | approximately 42,178 | approximately 42,178 |
| Eccentricity Squared | approximately 0.70 or larger and approximately 0.80 or smaller | approximately 0.24 or larger and approximately 0.38 or smaller | approximately 0.24 or larger and approximately 0.38 or smaller | approximately 0.42 or larger and approximately 0.48 or smaller |
| Orbital Inclination Angle (degree) | approximately 30 or larger and approximately 45 or smaller, or approximately 135 or larger and approximately 150 or smaller | approximately 35 or larger and approximately 40 or smaller, or approximately 140 or larger and approximately 155 or smaller | approximately 47 or larger and approximately 52 or smaller, or approximately 128 or larger and approximately 133 or smaller | approximately 62 or larger and approximately 66 or smaller, or approximately 114 or larger and approximately 118 or smaller |
| Argument of Perigee (degree) | approximately 90 or approximately 270 | approximately 90 or approximately 270 | approximately 90 or approximately 270 | approximately 90 or approximately 270 |
| Right Ascension of North-Bound Node (degree) | value set in responsive to the reference time when defining orbit-related elements | value set in responsive to the reference time when defining orbit-related elements | value set in responsive to the reference time when defining orbit-related elements | value set in responsive to the reference time when defining orbit-related elements |
| True Anomaly (degree) or a position on the orbit at a specified time | value set in responsive to the reference time when defining orbit-related elements | value set in responsive to the reference time when defining orbit-related elements | value set in responsive to the reference time when defining orbit-related elements | value set in responsive to the reference time when defining orbit-related elements |
| Example | Target Service Area | Whole Japanese land excluding isolated islands like Minamitorishima and Okinotorishima | Whole Japanese land | Whole world |
| Tolerable Elevation Angle (unit: degree) | 70 | 55 | | 50 |
| Number of Required Satellites | 3–4 | 2 | | 36 |

(2-2) Cases Assuming Services all over the World

Figure 6:
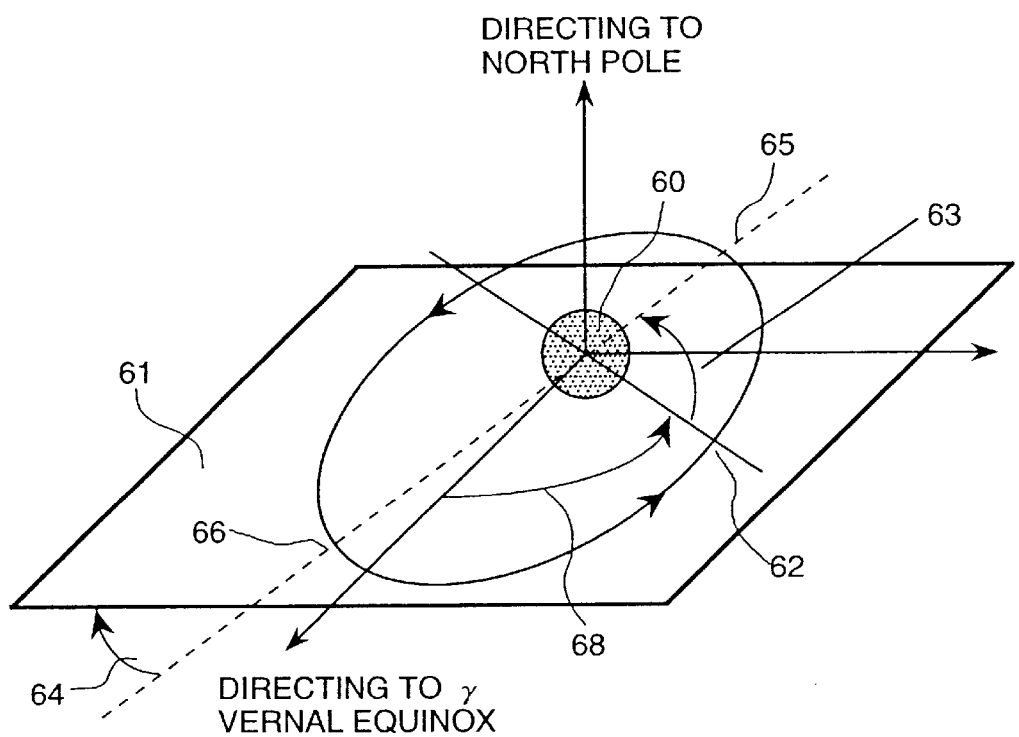
FIG. 6 is a geometrical diagram of six orbit-related parameters defining the shape of the orbit, in which the orbit and the earth are shown in bird's eye view.

In case the whole world is a target of services, the whole world is made to be divided into sub areas, each having a constant dimension, and the above described algorithm can be applied to the individual sub-areas. However, as for the areas near the Equator, there may be a case wherein a geostationary orbit brings better results than the elliptical orbit does, and therefore, it is effective to combine the elliptical orbit and the geostationary orbit in order to provide services all over the world. For example, by combining plural elliptical orbits having the orbit-related elements shown in FIG. 6 and geostationary satellites, the whore world can be covered for providing cervices.

TABLE 6

| Item Case ID | Value Case 4 |
|---|---|
| Semi-Major Axis (km) | approximately 42,178 |
| Eccentricity Squared | approximately 0.42 or larger and approximately 0.48 or smaller |
| Orbital Inclination Angle (degree) | approximately 62 or larger and approximately 66 or smaller, or approximately 144 or larger and approximately 118 or smaller |
| Argument of Perigee (degree) | approximately 90 or approximately 270 |
| Right Ascension of North-Bound Node (degree) | value set in responsive to the reference time when |

TABLE 6-continued

| Item<br>Case ID | Value<br>Case 4 |
|---|---|
| True Anomaly (degree) or a position on the orbit at a specified time | defining orbit-related elements value set in responsive to the reference time when defining orbit-related elements |

As described above, the ground-mapped orbit extends in the east and west directions by making the value of the eccentricity squared larger, and the ground-mapped orbit extends in the south and north directions by making the value of the orbital inclination angle larger. In this case, near the center part of the domain enveloped by the ground-mapped orbit, there occurs an area which can not obtain any service from the satellite. This problem can be solved by arranging another orbit so that its ground-mapped orbit may intersect its adjacent ground-mapped trace, as shown in FIG. 10.

(3) Method for Realizing the Defined Orbit-related Elements and for Controlling the Satellite The orbit of an artificial satellite having the orbit related elements so defined as described above is controlled in the following manner.

Figure 2:
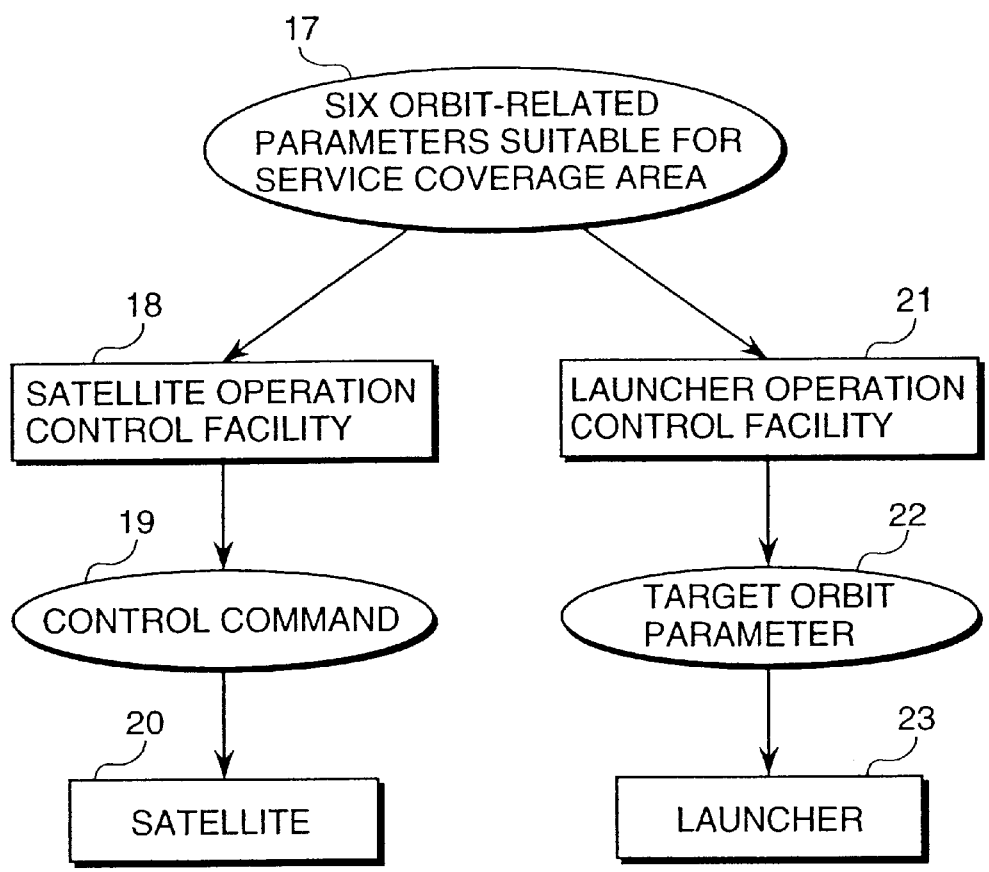
FIG. 2 is a diagram illustrating the information flow for controlling the orbit of the artificial satellite in compliance with six orbit-related parameters set by the algorithm of the present invention.

As shown in FIG. 2, when launching the artificial satellite 20, the information relating to the six orbit-related elements determined in advance to be suitable for the target service area is supplied to the launcher operation control facility 21, from which the information related to the target orbit parameters 22 is transferred to the launcher. The launcher 23 launches the satellite onto the target orbit automatically or in responsive to the control command from the launcher operation control facility 21.

After the satellite 20 is launched onto the target orbit, the information related to six orbit-related elements 17 suitable for the target service area is periodically supplied to the satellite operation control facility 18, and the information related to the control command 19 is transferred to the satellite 20, and finally, the orbit of the satellite 20 is controlled by the control system so as to trace the target orbit defined by the target six orbit-related elements.

As this orbit control method is compatible with conventional and general orbit control methods, the details thereof will be described later.

Next, more detailed examples of the individual embodiments referred to above will be described. In accordance with this invention, the following two concepts form a 2-by-2 matrix context:

orbit-related elements and their ranges defined by the algorithm of the present invention, and systems employing the satellites traveling on the orbits so defined.

These two concepts will be described separately. In addition, what will be described is an operative example of the method for controlling the satellite so as to trace the orbits with their six orbit related elements defined to be suitable for the target service area.

(4) Orbit-related Elements and their Range Obtained by the Algorithm in Accordance with the Present Invention (4-1) Orbit Arrangement Example 1

In this embodiment, an example of orbit arrangement is directed to services covering the whole Japanese territory. The orbit of an artificial satellite always fluctuates under the influence of the earth's gravitational field and the attractive forces produced by the Moon and Sun, and is controlled with some tolerance to a certain extent. For this reason, target nominal values after completing the orbit control are shown for the orbit-related elements to be shown in the individual examples of the orbit arrangement.

Figure 11:
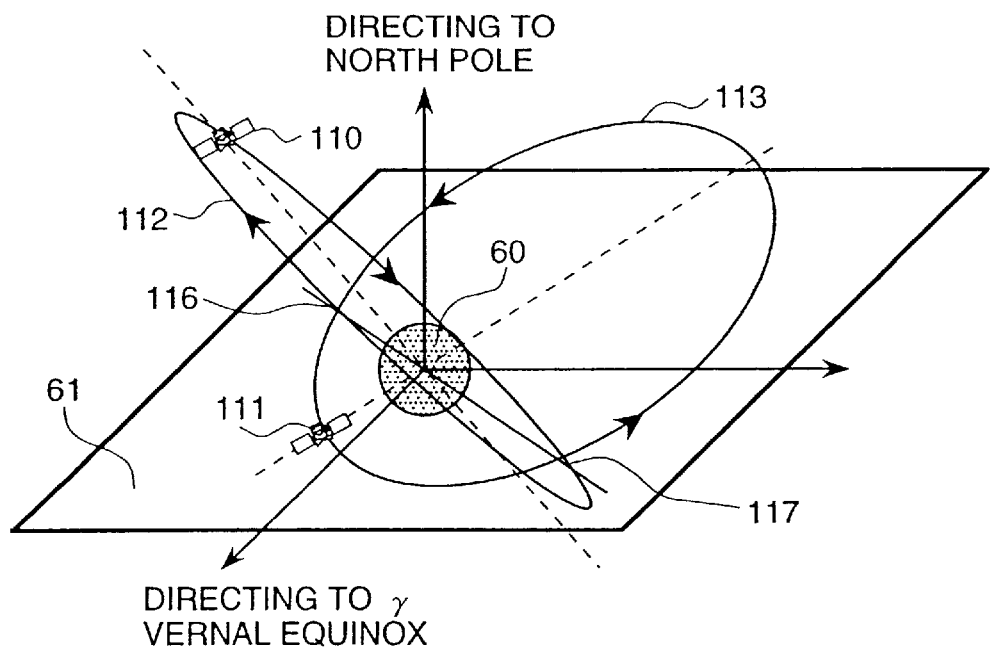
FIG. 11 is a diagram showing the orbit around the earth with respect to the orbit configuration example 1 obtained by the algorithm of the present invention.

In the example of the orbit arrangement, there are two orbit planes as shown in FIG. 11, and the satellite 110 and the satellite 111 are arranged on separate orbits, respectively. The satellite 110 completes the orbit 112 once in about 24 hours, and the satellite 111 completes the orbit 113 once in about 24 hours. The orbit cycle of the satellites 110 and 111 is about 24 hours, their eccentricity squared ranges between 0.24 and 0.38, their orbital inclination angle ranges between 47 degrees and 52 degrees or between 128 degrees and 133 degrees, and their argument of perigee is 270 degrees. As shown in FIG. 11, their right ascensions of north-bound node shift mutually by 180 degrees and are defined so that their apogees may be located at a desired position above the Japanese territory. In terms of relative position between the satellites on their own orbits, the satellite 111 is arranged to be located at the apogee on the orbit 113, while the satellite 110 is located at the perigee on the orbit 112. This orbit arrangement is obtained by the algorithm shown in FIG. 1 and is realized by the control method shown in FIG. 2.

With this orbit arrangement, at any position in the whole of Japan, including the northernmost point, the southernmost point, the easternmost point and the westernmost point, the satellite 110 or the satellite 111 can come in sight always in the zenith direction with its elevation angle more than 55 degrees. As the satellite 110 and the satellite 111 each have a 24-hour orbit cycle, the occurrence of in-sight and out-of-sight positions of the satellite in the zenith direction with its elevation angle more than 55 degrees is periodic and orderly. In this case, the satellite 110 and the satellite 111 alternately come in sight and out of sight with about a 12-hour cycle, and their duration time for in-sight positions in the zenith direction with its elevation angle more than 55 degrees is about 12 hours. There exists certainly a timing when both of the satellites 110 and 111 come in sight in the zenith direction with its elevation angle more than 55 degrees. This timing comes once every day with a 24-hour cycle.

Thus, by using a satellite represented by the satellite 90 to the communication satellite in FIGS. 13 to 16, showing examples of systems using the orbit arrangement described above, it will be appreciated that a communication system without communication blackout due to shielding and/or the presence of an obstacle can be achieved.

(4-2) Orbit Arrangement Example 2

In this embodiment, an example of an orbit arrangement directed to services covering the whole Japanese territory is considered.

Figure 12:
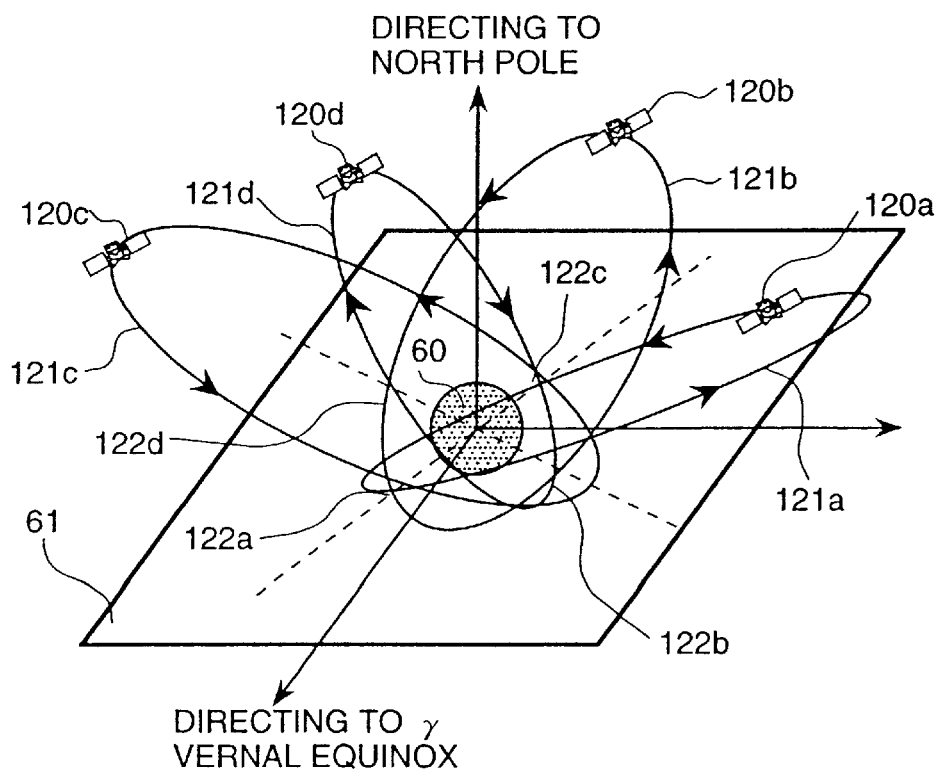
FIG. 12 is a diagram showing the orbit around the earth with respect to the orbit configuration example 2 obtained by the algorithm of the present invention.

In the example of such an orbit arrangement, there are four orbit planes, as shown in FIG. 12, and the satellite 120a, the satellite 120b, the satellite 120c and the satellite 120d are arranged on separate orbits, respectively. The satellite 120a travels on the orbit 121a, the satellite 120b travels on the orbit 121b, the satellite 120c travels on the orbit 121c and the satellite 120d travels on the orbit 121d, each satellite completing its orbit in about 12 hours. The orbit cycle of the satellites 120a, 120b, 120c and 120d is about 12 hours, their eccentricity squared ranges between 0.70 and 0.80, their orbital inclination angle ranges between 30 degrees and 45 degrees or between 135 degrees and 150 degrees, and their argument of perigee is 270 degrees. As shown in FIG. 12, their right ascensions of the north-bound node shift mutually by 90 degrees, and are defined so that their apogees may be located at a desired position above the Japanese territory. In terms of relative position between the satellites on their own orbits, the satellite 120*b* and the satellite 120*d* are arranged to be located at the apogee on their corresponding orbits 121*b* and 121*d*, respectively, while the satellite 120*a* and the satellite 120*c* are located at the perigee on the orbits 121*a* and 121*c*.

With this orbit arrangement, at the areas in Hokkaido, Honshu, Shikoku and Kyuhu and Okinawa, the satellite 120*a*, the satellite 120*b*, the satellite 120*c* or the satellite 120*d* can come in sight always in the zenith direction with its elevation angle more than 70 degrees. As the satellite 120*a*, the satellite 120*b*, the satellite 120*c* and the satellite 120*d* each have a 12-hour orbit cycle, the occurrence of in-sight and out-of-sight positions of the satellite in the zenith direction with its elevation angle more than 70 degrees is periodic and orderly. This orbit arrangement is obtained by the algorithm shown in FIG. 1, realized by the control method shown in FIG. 2. In this case, the satellite 120*a*, the satellite 120*b*, the satellite 120*c* and the satellite 120*d* alternately come in sight and out of sight once everyday, and their duration time for an in-sight position in the zenith direction with its elevation angle more than 70 degrees is about 6 hours. Thus, either of those satellites can come in sight one after another all day long for 24 hours in the zenith direction with its elevation angle more than 70 degrees. There exists certainly a timing when all of these satellites come in sight in the zenith direction with an elevation angle more than 70 degrees. This timing comes once every day with a 24-hour cycle.

Thus, by using a satellite represented by the satellite 90 to the communication satellite in FIGS. 13 to 16 showing examples of applying the orbit arrangement described above to specific systems, it will be appreciated that a communication system without communication blackout due to shielding and/or the presence of an obstacle can be realized.

The above example describes Case 3 in Table 4. Similarly for Case 2 in Table 4, by using an orbit arrangement in which the right ascensions of the north-bound node of the individual orbits are shifted by 90 degrees, either of the satellites can come in sight one after another always in the zenith direction with its elevation angle more than 70 degrees from the area of the Japanese territory excluding isolated southern islands, like Okinotori Island and Minamitori Island.

(4-3) Orbit Arrangement Example 3

In this embodiment, an example of an orbit arrangement is directed to services covering world-wide areas located between a north latitude of approximately 70 degrees and a south latitude of approximately 70 degrees.

In this example of orbit-related elements, orbits and satellites are selected in response to the latitude of the target service area. For the service areas located from a north latitude of approximately 70 degrees to a north latitude of 30 degrees, six orbital planes are arranged so that their right ascensions of the north-bound node may be shifted by 60 degrees, each orbital plane being formed so that the orbit cycle is 24 hours, the eccentricity squared is between 0.42 and 0.48, the orbital inclination angle is between 62 degrees and 66 degrees or between 114 degrees and 118 degrees, and the argument of perigee is 270 degrees, and a couple of satellites are arranged on the individual orbital planes. With respect to the relative position of two satellites on an identical orbital plane, one satellite is located on the perigee while the other satellite is located on the apogee. For the service areas located from a north latitude of 30 degrees to a south latitude of 30 degrees, 12 geostationary satellites are arranged on a geostationary orbit with their stationary positions shifted by 30 degrees in the longitudinal direction.

In addition, for the service areas located from a south latitude of 30 degrees to a south latitude of approximately 70 degrees, six orbital planes are arranged so that their right ascensions of the north-bound node may be shifted by 60 degrees, each orbital being plane formed so that the orbit cycle is 24 hours, the eccentricity squared is between 0.42 and 0.48, the orbital inclination angle is between 62 degrees and 66 degrees or between 114 degrees and 118 degrees, and the argument of perigee is 90 degrees, and a couple of satellites are arranged on the individual orbital planes. With respect to the relative position of two satellites on an identical orbital plane, also in this case, one satellite is located on the perigee while the other satellite is located on the apogee. The six orbital planes covering a service area from a north latitude of approximately 70 degrees to a north latitude of 30 degrees, and the six orbital planes covering a service area from a south latitude of 30 degrees to a south latitude of approximately 70 degrees share common orbital planes. A couple of satellites with their perigee located above the Southern Hemisphere, and a couple of satellites with their perigee located above the Northern Hemisphere travel on a single orbital plane, and six orbital planes so configured with satellites as described above exist with their orbit centers shifted by 60 degrees and around the center of the earth.

This orbit arrangement is obtained by the algorithm shown in FIG. 1, its orbit-related elements being shown in Table 4, as realized by the control method shown in FIG. 2. Owing to such an orbit arrangement and satellite arrangement, at the areas from a north latitude of approximately 70 degrees to a south latitude of approximately 70 degrees, at least one of 36 satellites described above can come in sight definitely in the zenith direction with its elevation angle more than 50 degrees. At the areas from a latitude of approximately 70 degrees to a latitude of 30 degrees, in north and south bound directions, as four or six satellites orbiting on adjacent orbital planes come in sight alternately in the zenith direction, communication lines to and from the satellites can be established continuously. As geostationary satellites are used at the areas from a north latitude of 30 degrees to a south latitude of 30 degrees, a satellite can always come in sight in a definite direction, and ultimately, stable communication can be available.

As described above, by using a satellite represented by the satellite 90 to the communication satellite in FIGS. 13 to 16 showing examples of applying the orbit arrangement described above to specific systems, it will be appreciated that a communication system without communication blackout due to shielding and/or the presence of an obstacle can be attained.

(4-4) Orbit Arrangement Example 4

In this embodiment, an example of the orbit arrangement is directed to services covering world-wide areas located between a north latitude of approximately 85 degrees and a south latitude of approximately 85 degrees.

In this example of orbit-related elements, orbits and satellites are selected in response to the latitude of the target service area. For the service areas located from a north latitude of approximately 85 degrees to a north latitude of 30 degrees, four orbital planes are arranged so that their right ascensions of the north-bound node may be shifted by 90 degrees, each orbital plane being formed so that the orbit cycle is 24 hours, the eccentricity squared is between 0.42 and 0.48, the orbital inclination angle is between 62 degrees and 66 degrees or between 114 degrees and 118 degrees, and the argument of perigee is 270 degrees, and three satellites are arranged on individual orbital planes with respect to the relative position of three satellites on an identical orbital plane, the time for the individual satellite passing at the perigee is shifted by about 8 hours on the orbit. For the service areas located from a north latitude of 30 degrees to a south latitude of 30 degrees, 12 geostationary satellites are arranged on a geostationary orbit with their stationary positions shifted by 30 degrees in the longitudinal direction. In addition, for the service areas located from a south latitude of 30 degrees to a south latitude of approximately 85 degrees, four orbital planes are arranged so that their right ascensions of the north-bound node may be shifted by 90 degrees, each orbital plane being formed so that the orbit cycle is 24 hours, the eccentricity squared is between 0.42 and 0.48, the orbital inclination angle is between 62 degrees and 66 degrees or between 114 degrees and 118 degrees, and the argument of perigee is 90 degrees, and three satellites are arranged on the individual orbital planes. With respect to the relative position of two satellites on an identical orbital plane, the time for the individual satellite passing at the perigee is shifted by about 8 hours on the orbit. The four orbital planes covering a service area from a north latitude of approximately 85 degrees to a north latitude of 30 degrees, and the four orbital planes covering a service area from a south latitude of approximately 85 degrees to a south latitude of 30 degrees share common orbital planes. Three satellites with their perigee located above the Southern Hemisphere, and three satellites with their perigee located above the Northern Hemisphere travel on a single orbital plane, and this kind of orbital plane, so configured with satellites as described above, exists with its orbit center shifted by 60 degrees and around the center of the earth.

This orbit arrangement is obtained by the algorithm shown in FIG. 1, its orbit-related elements being shown in Table 4, as realized by the control method shown in FIG. 2. Owing to such orbit arrangement and satellite arrangement, at the areas from a north latitude of approximately 85 degrees to a south latitude of approximately 85 degrees, at feast one of 36 satellites described above can come in sight definitely in the zenith direction with its elevation angle more than 50 degrees. At the areas from a latitude of approximately 85 degrees to a latitude of 30 degrees, in north and south bound directions, as the satellites orbiting on the adjacent orbital planes come in sight alternately in the zenith direction, communication lines to and from the satellites can be established continuously. As geostationary satellites are used at the areas from a north latitude of 30 degrees to a south latitude of 30 degrees, a satellite can always come in sight in a definite direction, and ultimately, stable communication can be attained.

According to the above described examples of orbit arrangement, satellite communication systems or earth observing systems in which at least one satellite can come in sight within a circular cone formed with a tolerable semi-vertical angle extended in the central axis to the zenith can be configured with the lowest number of satellites.

In comparison with global communication systems using another middle or high attitude satellite, the number of satellites required for the system according to the present invention can be reduced. For example, in the above orbit arrangement example 1, communication lines can be established continuously with at least two satellites. Since the cost including R&D, launching and operations can be reduced due to the less number of satellites, the overall cost required for total system construction can be reduced. Thus, ultimately, low-cost communication services can be provided.

(4-5) Orbit Arrangement Example 5

In this embodiment, an example of orbit arrangement is directed to services covering the whole Japanese territory.

In the example of such an orbit arrangement, there are four orbit planes as shown in FIG. 12, and the satellite 120a, the satellite 120b, the satellite 120c and the satellite 120d are arranged on separate orbits, respectively. The satellite 120a travels on the orbit 121a, the satellite 120b travels on the orbit 121b, the satellite 120c travels on the orbit 121c and the satellite 120d travels on the orbit 121d, each satellite completing an orbit once in about 24 hours. The orbit cycle of the satellites 120a, 120b, 120c and 120d is about 24 hours,their eccentricity squared ranges between 0.24 and 0.38, their orbital inclination angle ranges between 35 degrees and 40 degrees or between 140 degrees and 145 degrees, and their argument of perigee is 270 degrees. As shown in FIG. 12, their right ascensions of the north-bound node shift mutually by 90 degrees, and are defined so that their apogees may be located at a desired position above the Japanese territory.

In terms of relative position between the satellites on their own orbits, when the satellite 120a is located at the perigee on the orbits 121a, the satellite 120b and the satellite 120d are arranged to be shifted by 122.5 degrees from the apogee on their corresponding orbits 121b and 121d, respectively, and the satellite 120c is arranged to be located at the apogee on its corresponding orbit 12c.

With such an orbit arrangement, at the areas in Hokkaido, Honshu, Shikoku and Kyuhu and Okinawa, the satellite 120a, the satellite 120b, the satellite 120c or the satellite 120d can come in sight always in the zenith direction with its elevation angle more than 70 degrees. As the satellite 120a, the satellite 120b, the satellite 120c and the satellite 120d have a 24-hour orbit cycle, the occurrence of in-sight and out-of-sight positions of the satellite in the zenith direction with its elevation angle more than 70 degrees is periodic and orderly.

This orbit arrangement is obtained by the algorithm shown in FIG. 1, realized by the control method shown in FIG. 2. In this case, the satellite 120a, the satellite 120b, the satellite 120c and the satellite 120d alternately come in sight and out of sight once everyday, and their duration time for in-sight positions in the zenith direction with its elevation angle more than 70 degrees is about 6 hours.

Thus, either of those satellites can come in sighs one after another all day long for 24 hours in the zenith direction with its elevation angle more than 70 degrees. There exists certainly a timing when all of these satellites come in sight in the zenith direction with an elevation angle more than 70 degrees. This timing comes once every day with a 24-hour cycle.

Thus, by using a satellite represented by the satellite 90 to the communication satellite in FIGS. 13 to 16 showing examples of applying the orbit arrangement described above to specific systems, it will be appreciated that a communication system without communication blackout due to shielding and/or the presence of an obstacle can be attained.

In the Orbit Arrangement Example 1 described above, what is shown is an example in which either of two satellites can come in sight one after another all day long for 24 hours in the zenith direction with its elevation angle more than 55 degrees. In contrast, in the Orbit Arrangement Example 5 using 4 satellites, any of those satellites can come in sight one after another all day long for 24 hours in the zenith direction with its elevation angle more than 70 degrees. Tables 8, 9 and 10 show the occurrence of in-sight and out-of-sight positions of satellites from 10 cities in Japan.

TABLE 8

| CITY | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 0 | more than 80 |
|---|---|---|---|---|---|---|---|---|---|---|---|---|---|---|---|---|---|---|---|---|---|---|---|---|---|---|
| Northernmost of JP Etorofu N45° 33.3' E148° 45.5' | (Ambsat-3) 0:00:00 | | 2:16:53 1:52:09 | | (Ambsat-4) | | | 7:51:09 8:15:39 | | (Ambsat-1) | | | | 13:50:06 | 14:14:55 | | (Ambsat-2) | | | 19:49:07 | 20:14:13 | | | (Ambsat-3) | 0:00:00 | 6.02% |
| Easternmost of JP Minamitorishima N24° 17.0' E153° 59.2' | 0:00:00 | | | (Ambsat-4) | | 5:18:27 5:40:28 | | | (Ambsat-1) 11:17:33 | | | 11:39:59 | | | | | 17:16:27 | 17:39:28 | (Ambsat-3) (Ambsat-4) | | | | | 23:38:04 23:15:22 | 0:00:00 | 36.50% |
| Southernmost of JP Okinotorishima N24° 17.0' E136° 4.9' | 0:11:14 | | (Ambsat-3) | | 4:46:04 6:09:44 | | (Ambsat-4) | | | 10:44:19 | | 12:09:0 | | (Ambsat-1) | | | 16:44:11 18:08:3 | | (Ambsat-2) | | | | 23:38:04 | | 0.00% |
| Westernmost of JP Yonakunijima N24° 26.6' E122° 56.0' | (Ambsat-2) 0:00:00 0:40:21 | 0:51:07 | | (Ambsat-3) | | | 6:50:03 6:38:57 | | (Ambsat-4) | | 12:49:00 | | 12:38:23 | (Ambsat-1) | | | 18:48:04 18:37:5 | | (Ambsat-2) | | | | 0:00:00 | | 41.25% |

TABLE 9

| CITY 名称 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 0 | |
|---|---|---|---|---|---|---|---|---|---|---|---|---|---|---|---|---|---|---|---|---|---|---|---|---|---|---|
| Sapporo N43° 4' E141° 21' | (Ambsat-3) 0:00:00 | | | 3:27:55 2:07:36 | | (Ambsat-4) | | | 8:06:43 9:26:46 | | (Ambsat-1) | | | 14:05:49 | | 15:25:56 | | (Ambsat-2) | | 20:04:43 | | 21:25:07 | | (Ambsat-3) | 0:00:00 | 57.06% |
| Sendai N38° 16' E140° 52' | 0:00:00 | | (Ambsat-3) 1:41:23 | | 3:57:11 | | (Ambsat-4) | 7:40:34 | | 9:55:59 | | | | 13:39:43 | | 15:55:12 | | (Ambsat-1) (Ambsat-2) | | 19:38:35 | | 21:54:27 | | (Ambsat-3) | 0:00:00 | 79.31% |
| Tokyo N35° 39' 16" E139° 44' 41" | 0:00:00 | | (Ambsat-3) 1:39:20 | | | 4:15:14 | (Ambsat-4) | 7:38:34 | | | 10:14:01 | | | 13:37:47 | | | 16:13:15 | (Ambsat-1) (Ambsat-2) | | 19:36:36 | | | 22:12:31 | (Ambsat-3) | 0:00:00 | 82.86% |
| Niigata N37° 55' E139° 2' | 0:00:00 | | (Ambsat-3) 1:53:04 | | | 4:12:21 | (Ambsat-4) | 7:52:17 | | | 10:11:11 | | | 13:51:29 | | | 16:10:23 | (Ambsat-1) (Ambsat-2) | | 19:50:18 | | | 22:09:35 | (Ambsat-3) | 0:00:00 | 80.30% |
| Nagoya N35° 10' E136° 55' | 0:00:00 | | (Ambsat-3) 2:01:58 | | 4:38:41 | (Ambsat-4) | | | 8:01:16 | | 10:37:31 | | | | 14:00:00 | | 16:36:42 | (Ambsat-1) (Ambsat-2) | | 19:59:18 | | | 22:35:55 | (Ambsat-3) | 0:00:00 | 81.76% |

TABLE 10

| CITY | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 0 | |
|---|---|---|---|---|---|---|---|---|---|---|---|---|---|---|---|---|---|---|---|---|---|---|---|---|---|---|
| Osaka N34° 41′ E135° 29′ | 0:00:00 | | (Ambsat-3) 2:14:37 | | 4:50:47 | | (Ambsat-4) | | 8:13:57 | | 10:49:37 | | (Ambsat-1) | | 14:13:17 | | 16:48:48 | | (Ambsat-2) (Ambsat-3) | | 20:12:01 | | 22:47:59 | | 0:00:00 | 79.94% |
| Hiroshima N34° 23′ E132° 27′ | 0:00:00 | | (Ambsat-3) 2:46:07 | | 5:11:55 | | (Ambsat-4) | | 8:45:31 | | 11:10:48 | | (Ambsat-1) | | 14:44:56 | | 17:09:56 | | (Ambsat-2) (Ambsat-3) | | 20:43:36 | | 23:09:04 | | 0:00:00 | 74.92% |
| Kouchi N33° 33′ E133° 32′ | 0:00:00 | | (Ambsat-3) 2:34:19 | | 5:08:35 | | (Ambsat-4) | | 8:33:44 | | 11:07:27 | | (Ambsat-1) | | 14:33:08 | | 17:06:37 | | (Ambsat-2) (Ambsat-3) | | 20:31:48 | | 23:05:47 | | 0:00:00 | 75.19% |
| Fukuoka N33° 35′ E130° 24′ | 0:00:00 | | (Ambsat-3) 3:11:03 | | 5:27:44 | | (Ambsat-4) | | 9:10:32 | | 11:26:39 | | (Ambsat-1) | | 15:10:01 | | 17:25:45 | | (Ambsat-2) (Ambsat-3) | | 21:08:3 | | 23:24:52 | | 0:00:00 | 70.04% |
| Naha N26° 13′ E127° 40′ | (Ambsat-2) 0:00:00 0:00:00 | 0:16:25 | (Ambsat-3) | | 4:57:56 | | 6:15:18 (Ambsat-4) | | | | 12:14:10 | 10:57:41 | (Ambsat-1) | | | | 16:57:30 | 18:13:19 | (Ambsat-2) (Ambsat-3) | | | | 22:55:55 0:00:00 | | 0:00:00 | 39.10% |

In Tables 8 to 10, terms "Ambsat-1" to "Ambsat-4" represent identification codes for the individual satellites. In those tables, the fine line represents the time period for which the satellite is in sight, with its elevation angle more than 55 degrees, from the individual city, and the thick line including the fine line represents the time period for which the satellite is in sight, with its elevation angle more than 80 degrees, from the individual city.

According to this orbit arrangement example, in the area from Sendai down to Osaka, any of the satellites can come in sight in the zenith direction with its elevation angle more than 80 degrees for a time period of more than 80% of a 24-hour day.

(5) Systems Using Satellites Traveling On Orbits in Accordance With the Present Invention (5-1) System Example 1

Figure 13:
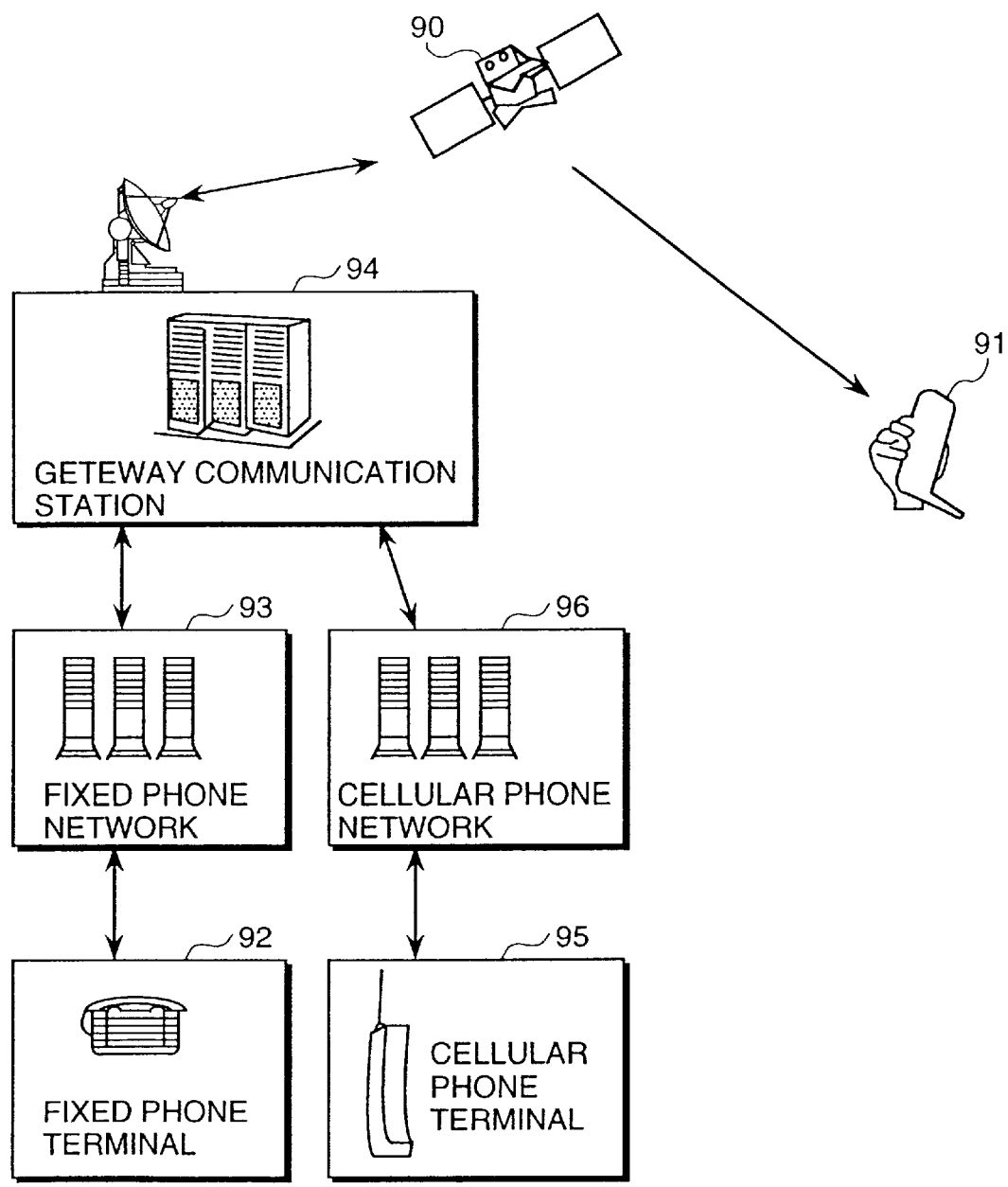
FIG. 13 is a block diagram showing an application example of a mobile telephone system.

System Example 1 is a satellite communication system covering the communication services in the whole Japanese territory, and FIG. 13 shows an example of a Mobile Communication Phone System.

As shown in FIG. 13, this system is composed of an artificial satellite 90 having an attitude control subsystem suitable for the above mentioned elliptic orbits, a power supply subsystem, a communication subsystem and a thermal control subsystem, a ground mobile communication terminal 91 making it possible to perform satellite communication via the artificial satellite 90, a fixed phone terminal 92, a fixed phone network 93, a cellular phone terminal 95, a cellular phone network 95 and a gateway communication station 94.

The ground mobile communication terminal 91 enables communication with fixed phone terminals 92 and/or cellular phone terminals 95. In the case in which the ground mobile communication terminal 91 is used within a target service area which is characterized by one of the input conditions for defining six orbit-related elements of the satellites in accordance with the present invention, the ground mobile communication terminal 91 has a send/receive means for sending and receiving signals with the satellite 90 coming in sight within a predetermined range of elevation angle extended in the zenith direction. With this configuration, for example, in case of using a directional antenna as a send/receive means in the ground mobile communication terminal 91, the user does not need to search for the direction (north,south, east or west) in which the satellite can be reached, but only directs the antenna in the zenith direction wherever he or she may be in the service area.

According to this system example, global-scale mobile communication services, such as cellular phone and car phone services, can be provided. As global-scale communication systems can be configured with a smaller number of satellites, low-cost communication services can be provided.

(5-2) System Example 2

Figure 14:
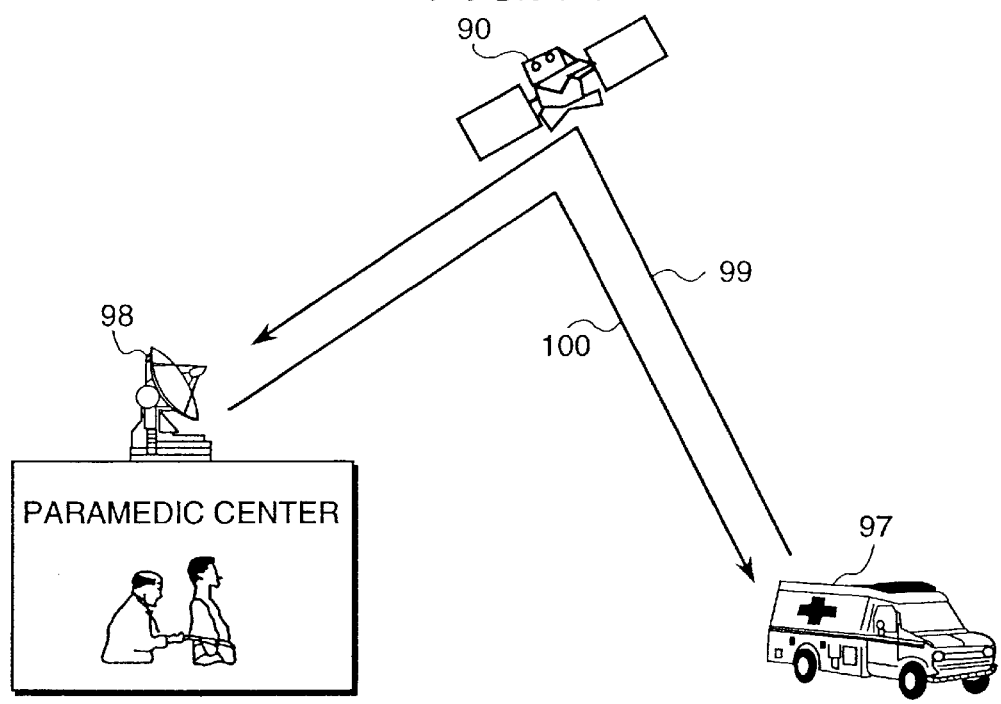
FIG. 14 is a diagram showing an example of the system mainly for the image transmission from a mobile object like an ambulance.

System Example 2 is a satellite communication system directed to domestic service covering the whole Japanese territory, and FIG. 14 shows an example of image transfer system for vehicles, such as an ambulance.

As shown in FIG. 14, this system is composed of an artificial satellite 90 having an attitude control subsystem suitable for maintaining the above mentioned elliptic orbits, including a power supply subsystem, a communication subsystem and a thermal control subsystem, an ambulance 97 and a critical care center 98. The image data 99 produced by an endoscope, a sonagram an electrocardiogram and a camera used for emergency cases carried by the ambulance 97 are transferred to the critical care center 98 via satellite 90, and some feedback information 100 related to emergency treatment suitable for the emergency cases can be transferred from the critical care center 98. Though an ambulance in a paramedic system is taken to be an example of the mobile environment here, another system similar to this example can be applied to the cases in which a large amount of date may be transferred from and to a movable body.

According to this system, since at least one satellite will come in sight within a circular cone with its semi-vertical angle extended in the central axis to the zenith, stable communication lines can be easily established for a long period of time by using the satellite according to the present invention, even in such an area in which the field of vision may be blocked by artificial building structures, plants and natural topographic features. With this system, image data transfer from movable bodies, such as ambulance and an outside broadcast van, for relay from the spot can be made available almost on a full-time basis without influence by environmental obstructions. In addition, according to this example, as image data related to emergency cases are transferred from the ambulance to the critical care center and feedback information related to emergency treatment suitable for the emergency cases can be obtained within the moving ambulance, suitable treatment can be applied to the emergency cases while carrying a patient to the critical care center. Thus, it will be appreciated that the life of the emergency case may be saved if suitable treatment could be made available to the emergency case while carrying a patient to the critical care center. This system also can be applied to TV systems for broadcasting sports events, in which high quality images can be transferred in real time.

(5-3) System Example 3

Figure 15:
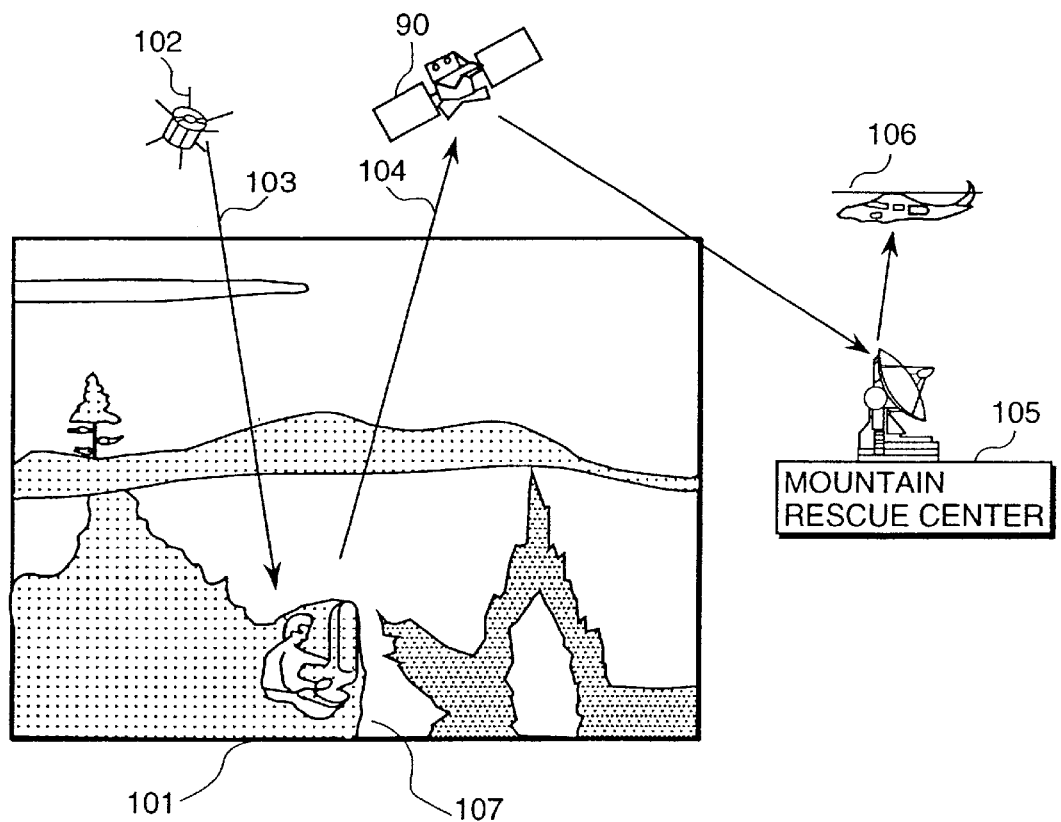
FIG. 15 is a diagram showing an example of a rescue system used in mountain or ocean areas.

System Example 3 is a satellite communication system directed to a domestic service covering the whole Japanese territory, and FIG. 15 shows an example of a rescue support system for mountain and/or ocean areas.

As shown in FIG. 15, this system is composed of an artificial satellite 90 having an attitude control subsystem suitable for maintaining the above mentioned elliptic orbits, including a power supply subsystem, a communication subsystem and a thermal control subsystem, an artificial satellite 102 forming an global earth observing system, a mobile communication terminal 107 which makes it possible to measure the location of the person in trouble by measurement signals from the global earth observing system and to communicate via satellite 90, and a mountain rescue center 105 located in police and/or fire stations. A climber in distress 101 on a mountain can identify his or her location by using the mobile communication terminal 107 while receiving the position signal 103 from the satellite 102 forming a part of the global earth observing system, and can transfer data 104 including his or her position, ID, and number of accompanying persons, to the mountain rescue center 105 in the police and/or fire stations via satellite 90. In responding to such data, the mountain rescue center initiates rescue operations. In this case, if a rescue helicopter 106 is available, by transferring the data 104 to the rescue helicopter 106, rescue operations can be developed more rapidly. In this case, an application of the system to the rescue of mountain climbers is merely one example, since this system can be applied to rescue the of anyone, such as people lost at sea.

According to this example, a person in distress on a mountain or in the ocean can identify his or her position and transmit it to a rescue center via satellites. Conventionally, in order to search for people in distress on mountains, a rescue team searches for the person in distress by using many helicopters and/or walking through mountains. By using this system, since it is possible to identify the position of people in distress in advance, the activity of the rescue team can be optimized and a prompt rescue operation can be developed.

(5-4) System Example 4

Figure 16:
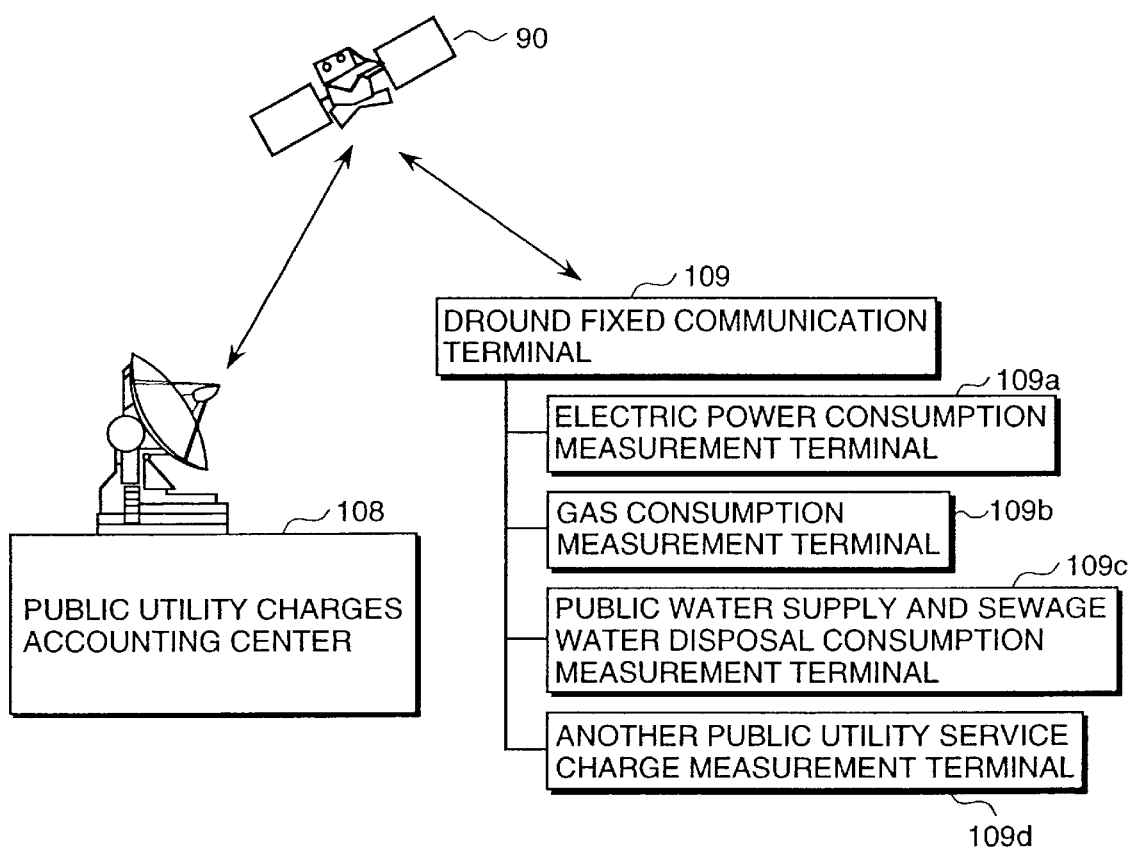
FIG. 16 is a diagram showing an example of an automated accounting system for public utility charges.

System Example 4 is a satellite communication system directed to a domestic service covering the whole Japanese territory, and FIG. 16 shows an example of an automated accounting system for public utility charges.

As shown in FIG. 16, this system is composed of an artificial satellite 90 having an attitude control subsystem suitable for maintaining the above mentioned elliptic orbits, including a power supply subsystem, a communication subsystem and a thermal control subsystem, an artificial satellite 102 forming a global earth observing system, a public utility gcharge accounting center 108, a fixed communication terminal 109 which makes it possible to communicate vie satellite 90 and terminals 109a, 109b, 109c and 109d for measuring the consumption of electricity, gas and water. The fixed communication terminal 109 and the measurement terminals 109a, 109b, 109c and 109d for measuring the consumption of electricity, gas and water are installed in individual houses, multiple dwelling houses and large buildings. Those terminals measure the amount of consumption and transfer the measured data periodically to the public utility charge accounting center 108 via satellite 90. With this system, conventional and human-intensive door-to-door efforts for reading meters for electricity, gas and water supply can be automated efficiently, and a billing operation for all the public utility charges can be processed.

In this system, by using the satellites traveling on the orbits in accordance with the present invention, satellite communication lines can be easily established even with an antenna facility located on a lower building surrounded by high-rise buildings. By applying this system, public utility charges which are now processed with conventional and human-intensive door-to-door efforts for reading meters for electricity, gas and water can be accounted via satellite, and a labor cost required for reading meters can be reduced to a large extent, which, ultimately, will be expected to cut public utility charges.

In the system examples 1 to 4, though the satellite 90 in FIGS. 13 to 16 is shown as a single satellite, this illustration of a satellite is representative of plural satellites. The artificial satellite 102 is also representative of Navstar satellites forming a Global Positioning System (GPS) of USA, GLONASS satellites for a navigation system, multi-purpose transportation satellites of Japan and so on.

(5-5) System Example 5

Figure 17:
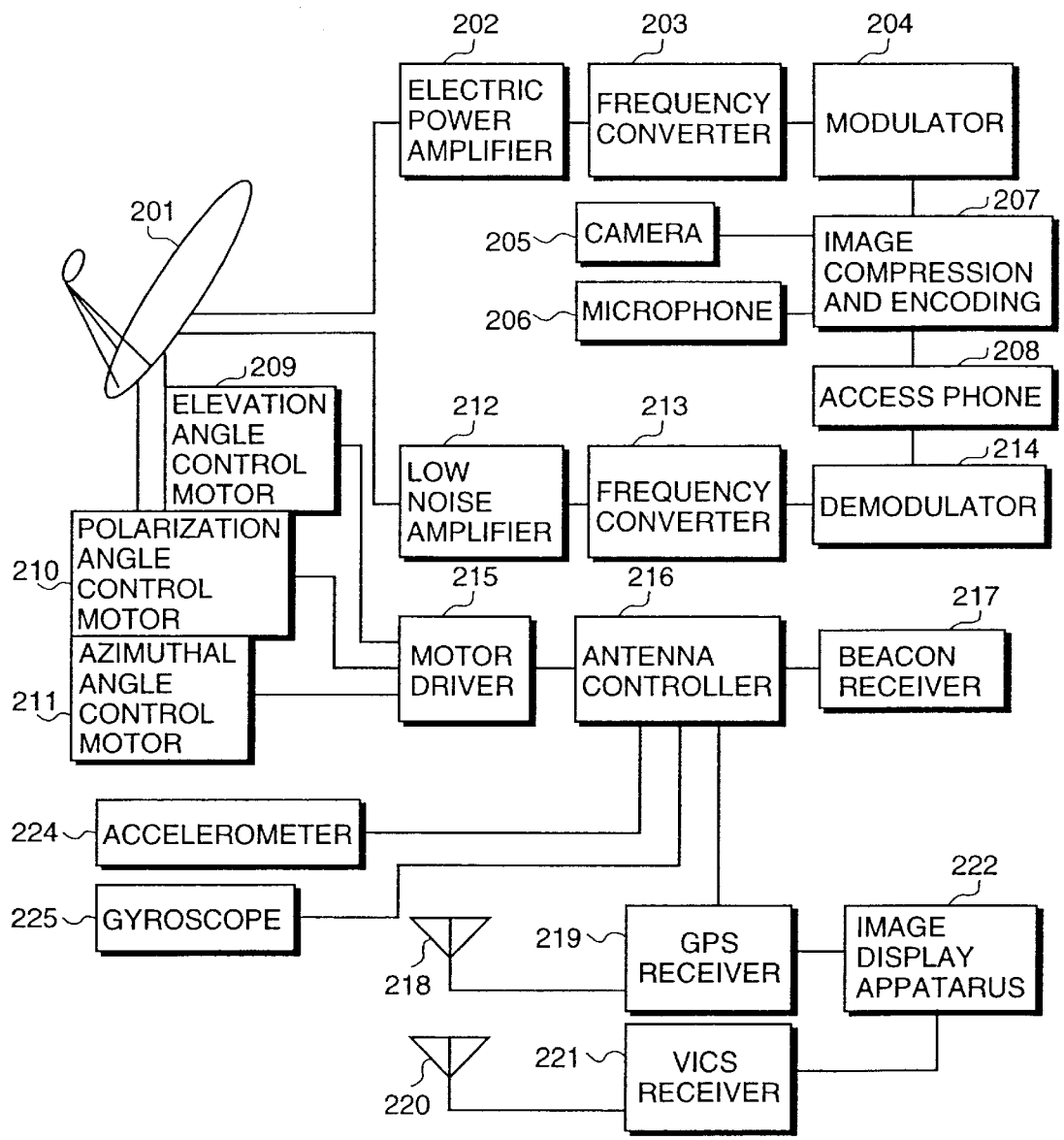
FIG. 17 is a diagram showing another example of a system used mainly for image transmission from a movable body like an ambulance.

FIG. 17 shows an example of a system configuration of a satellite communication mobile station mounted on the ambulance 97 shown in FIG. 14.

This system is used for transferring normal-quality dynamic picture images, high-quality dynamic or static picture images, medical inspection data related to the status of an emergency case, and for receiving medical treatment directions from the critical care center 98 operated as a base station for the communication system, through stable data transfer lines established by using satellites located in the direction of high-elevation angles so as to be not influenced by the moving location and communication condition of the ambulance 97.

This system has the following means as components used for exchanging data via satellite: send/receive antenna 201, electric power amplifier 202, frequency converter 203, modulator 204, camera 205, microphone 206, image compression and encoding apparatus 207, access telephone 208, low noise amplifier 212, frequency converter 213 and demodulator 214.

In addition, this system has the following means for attitude control of the send/receive antenna 201 mounted on the moving ambulance 97: Beacon receiver 217, antenna controller 216, motor driver 215, elevation angle control motor 209, polarization angle control motor 210 and azimuthal angle control motor 211.

And furthermore, this system has the following means as components for supplying supplementary data used for optimizing means for attitude control of the send/receive antenna: accelerometer 224, gyroscope 225, GPS antenna 218, VICS antenna 220, GPS receiver 219, VICS receiver 221 and image display apparatus 222.

In this system, the EMT (emergency medical technician) on board the ambulance can have a conversation with a duty doctor at the critical care center 98 by using access telephone 208 via satellite 90. Image and voice information related to the physical condition of the emergency case are obtained by the access telephone 208, the camera 205 and the microphone 206, and are processed for image compression and encoding by the image compression and coding apparatus 207, and then, modulated by the modulator 204, and next, multiplied by the electric power amplifier 202, and finally, sent from the send/receive antenna 201 to the satellite 90.

The information received by the satellite 90 is transferred from the satellite 90 to the critical care center 98. At the critical care center 98, the duty doctors examine the data related to the emergency case and send directions for suitable medical treatment to the ambulance 97 via satellite 90.

The information for medical treatment for the emergency case is received by the send/receive antenna 210 mounted on the ambulance 97, and after being amplified by the low noise amplifier 212, frequency conversion is effected using the frequency converter 213, and then, the processed signal is demodulated by the demodulator 214 and forwarded to the access telephone, with which the EMT can receive the directions for the medical treatment issued by the duty doctors at the critical care center.

The intensity of the signal received by the send/receive antenna 201 is optimized by driving the elevation angle control motor 209, the polarization angle control motor 210 and the azimuthal angle control motor 211 with the motor driver 215 responding to the signal from the antenna controller 216, and changing the direction of the send/receive antenna 201 so that the intensity of the Beacon signal separated by the frequency converter 213 and received by the Beacon receiver may be optimized.

When changing the direction of the antenna, it is possible to use, as one parameter for optimization, the position signal received from GPS satellite forming the global earth observing system by GPS antenna 218 and GPS receiver 219. In addition, by detecting the change in the moving direction of the ambulance using the accelerometer 224 and the gyroscope 225 and configuring the system so as to supply supplementary data for attitude control for the antenna, it is possible to configure the system to establish high-adaptability in the attitude control of the antenna.

The route selection of the ambulance can be supported with GPS receiver 219 and GPS antenna 218, and also with information supplied by VICS antenna 220 and VICS receiver 221.

(5-6) System Example 6

Figure 18:
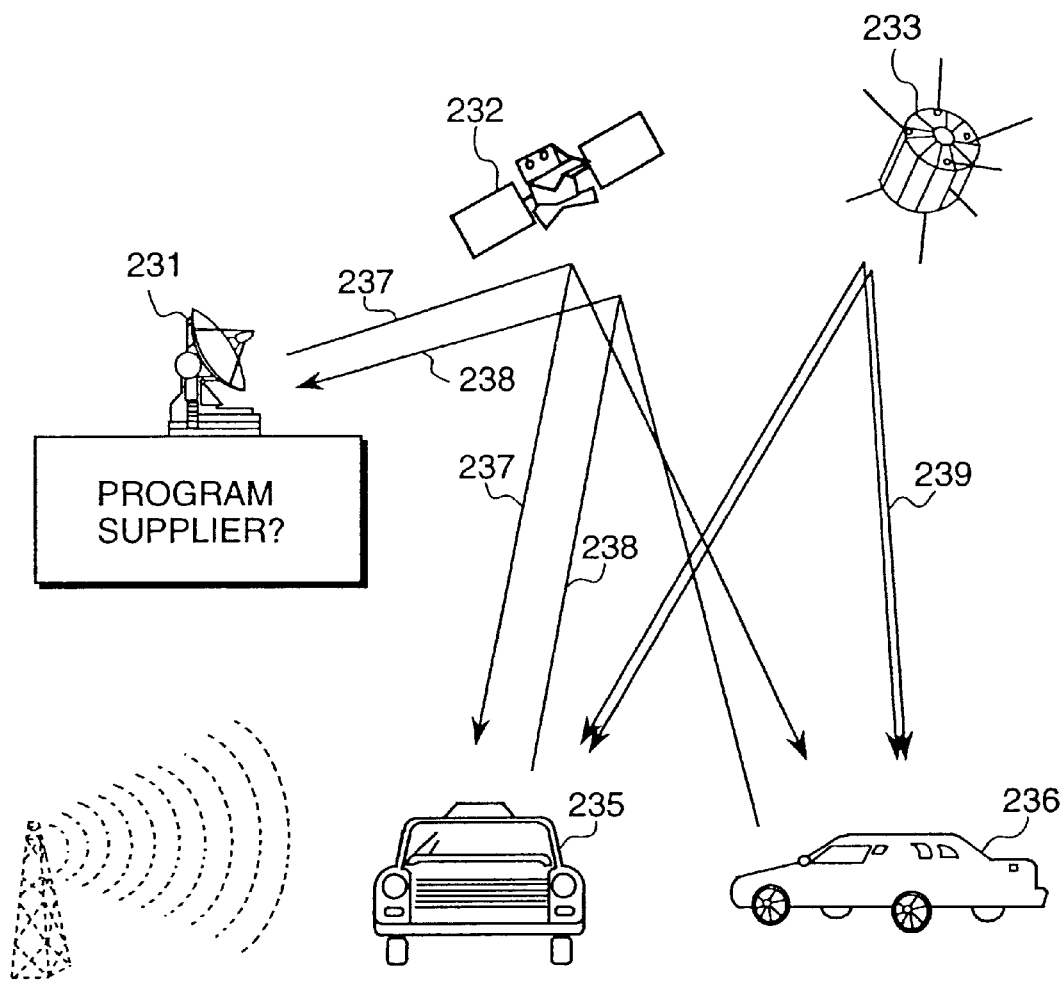
FIG. 18 is a diagram showing an example of a system for dispatching programs to a plurality of movable bodies.

System Example 6 is a satellite communication system directed to a domestic service covering the whole Japanese territory, and FIG. 18 shows an example of a program in a system having plural movable bodies.

Figure 19:
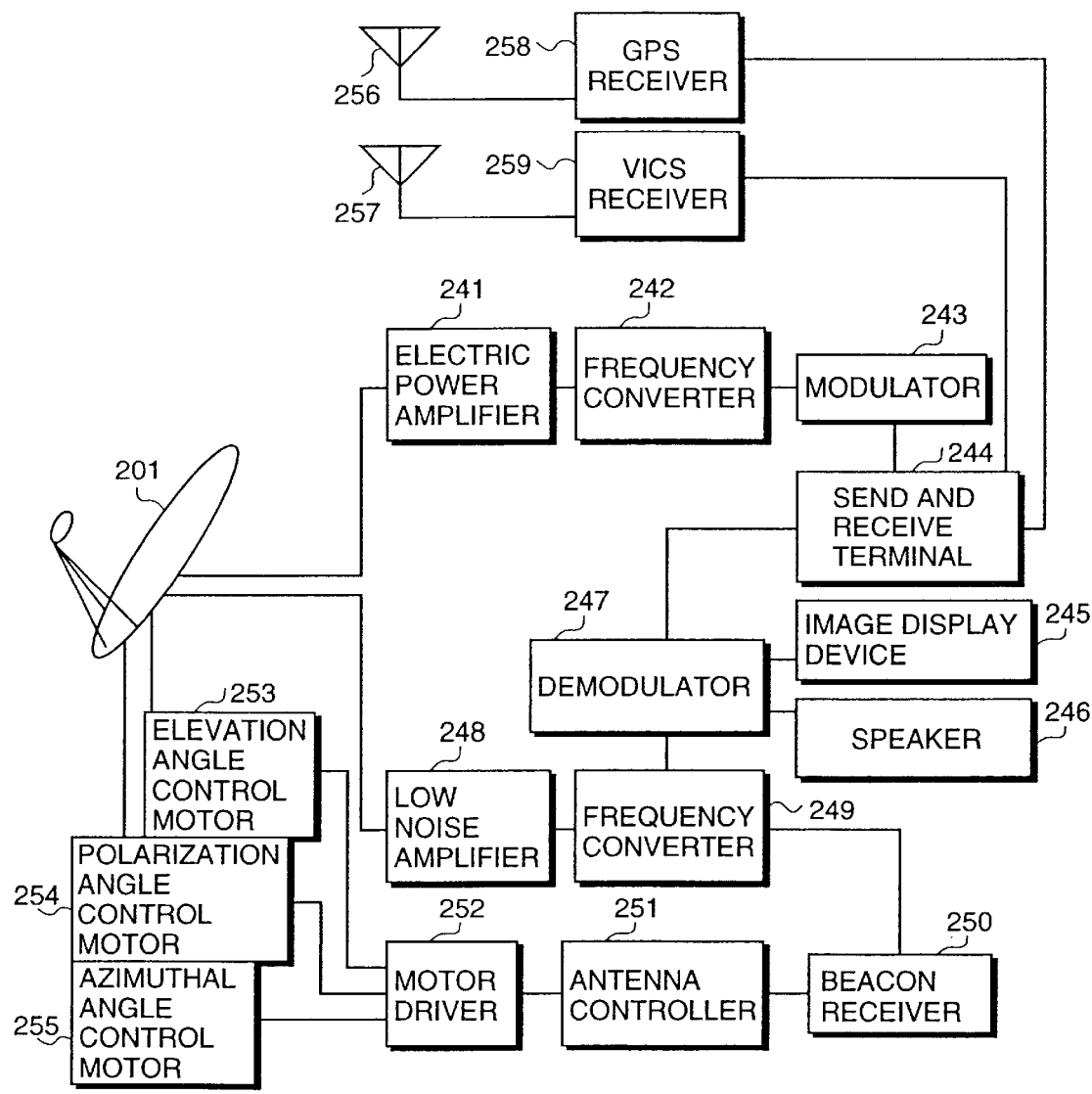
FIG. 19 is a block diagram showing an example of a mobile communication system for the system shown in FIG. 18.

As shown in FIG. 18, this system is composed of an artificial satellite 232 having an attitude control subsystem suitable for the above mentioned elliptic orbits, a power supply subsystem, a communication subsystem and a thermal control subsystem, a satellite communication ground station 231 for supplying programs to plural movable bodies, an artificial satellite 233 forming a global earth observing system, movable bodies 235 used for public transportation, such as a taxi and a railway vehicle, movable bodies 236 used for private transportation, such as an owner-driver car, and a master station 234 for sending VICS information. In this system, communication system devices to be described in FIG. 19 are loaded on the movable bodies 235 and 236.

GPS antenna 256 and GPS receiver 257 are loaded on the movable bodies 235 and 236, respectively, which receive position signals from the artificial satellite 233 forming a global earth observing system and operate to measure its own position, attitude and velocity, and send the measured information back to the send/receive terminal 244. The movable bodies 235 and 236 have a receiving antenna 257 and VICS receiver 259, which receive signals from a VICS information base station, and perform a function for receiving traffic jam information, the received information being forwarded similarly to the send/receive terminal 244. The send/receive terminal 244 accepts operation commands supplied by the system user for selecting his or her desired information from available information, and collects the selected information.

The information obtained by GPS receiver 258, the information obtained by VICS receiver 259 and the collected information selected by the system user is processed in the send/receive terminal 244, and is next modulated by the modulator 243, then processed by the frequency converter 242, and after the processed signal is amplified by the power amplifier 241, the amplified signal is sent to the satellite 232 from the send/receive antenna 240.

This transmitted signal is transferred to the satellite communication base station 231 of the program supplier via satellite 232. In the satellite communication base station 231, according to the information transmitted from the movable bodies 235 and 236, the programs suitable for the location, time zone and user's request, while those movable bodies move, are distributed to the movable bodies 235 and 236 via satellite 232.

In accordance with the present invention, the classes of programs to be distributed are not limited. According to the present invention, since the satellite 232 can be located at a higher elevation angle, stable and continuous transmission lines via satellite 232 can be established without being influenced by the moving status of the movable bodies. Therefore, dynamic picture images, static picture images and teletext can be received. As some specific class of programs may requires additional signal processing methods and devices, like frame memories, necessary modification and extension for the system configuration are to be considered.

As for programs to be distributed, for example, there are discount sales information from department stores and supermarts, exhibition announcements from art galleries and museums, cinema programs from movie theaters, criminal suspects and missing persons information, and Internet information.

The movable bodies 235 and 236 receive the information sent via satellite 232 from the satellite communication base station 231 of the program supplier via the send/receive antenna 240 mounted thereon. The received signals are amplified by the low noise amplifier 248, and then processed by the frequency converter 249, and after being modulated by the modulator 247, the video information is displayed on the image display device 245 and the audio information is output from the speaker 246.

The modulated signal supplied from the modulator 247 contains the program information to be selected on the basis of local areas in which the movable bodies move, and this information can be recognized as video and/or audio information from the image display device 245 and/or the speaker 246, as well as being forwarded to the send/receive terminal 244.

The intensity of the signal received by the send/receive antenna 240 is optimized by driving the elevation angle control motor 253, the polarization angle control motor 254 and the azimuthal angle control motor 255 with the motor driver 252 responding to the signal from the antenna controller 251, and by changing the direction of the send/receive antenna 240 so that the intensity of the Beacon signal separated by the frequency converter 249 and received by the Beacon receiver may be optimized.

According to this system, the information suitable for a designated location in an urban area can be definitely transferred to the movable body. If the conventional {rv set is loaded on the movable body and TV signals from the ground station or the geostationary satellite are received using a conventional method, the TV programs can not be continuously and stably enjoyed on the movable bodies because of the influence of building structures and trees which may block the TV signals. However, in the transmission and communication lines of this system, TV signals come from the upper air in the zenith direction. Therefore, TV signals are not influenced so much by building structures and trees, and TV programs can be enjoyed stably.

In addition, according to this system, as department stores and supermarts can distribute discount sales information in a timely manner to the movable bodies moving in the neighboring areas of the stores, it will be appreciated that the stores may expect to bring in more customers.

In addition, by providing information related to criminal suspects and missing persons with photos transmitted to the movable bodies, it will be appreciated that criminal suspects and missing persons may be found earlier than expected.

The above described system examples 1 to 6 assume that the target service area provided by the satellite on the elliptical orbit in accordance with the present invention is the whole Japan territory, and that the services may be available when the elevation angle of the satellite as viewed from the location in the target service area becomes higher. However, the present invention is not limited to this case. For example, in case the elevation angle of the satellite viewed from the location in the target service area becomes lower, the following applications can be considered.

In response to the trajectory of the elliptical orbit of the satellite, in case the elevation angle of the satellite as viewed from the location in the target service area becomes lower, the communication service between the locations outside the target service area and the locations inside the target service area can be relayed. In case the elevation angle becomes much lower, the communication service between other areas outside the target service area can be relayed.

(6) Satellite Orbit Control System Example

The orbit of the above described satellites is controlled in the following manner.

Six orbit-related elements suitable for the target service area obtained by the algorithm shown in FIG. 1 (semi-major axis 11, perigee argument 12, eccentricity squared 13, orbital inclination angle 14, right ascension of north-bound node 15 and true anomaly 16) are put into the launcher operation control facility 21 as target orbit parameters as shown in FIG. 2. This information is transferred from the launcher operation control facility 21 to the launcher 23 in order to launch the satellite 20 onto the target orbit. In case the launcher 23 loaded with the satellite 20 happens to stray off the target orbit during the launching operation, it is possible for the launcher 23 itself to correct its orbit or it is possible for the launcher operation control facility 21 to send the operation command for correcting the orbit to the launcher 23 and navigate the launcher.

Even after the satellite reaches the target orbit having the target orbit-related elements 22, the orbit-related elements will be perturbed by the influence of the earth's gravitational field, the attractive force produced by the Moon and the Sun and solar wind, and so the orbit-related elements change all the time in a short cycle or a long cycle. In such a case, the satellite 20 requires an orbit control.

Figure 3:
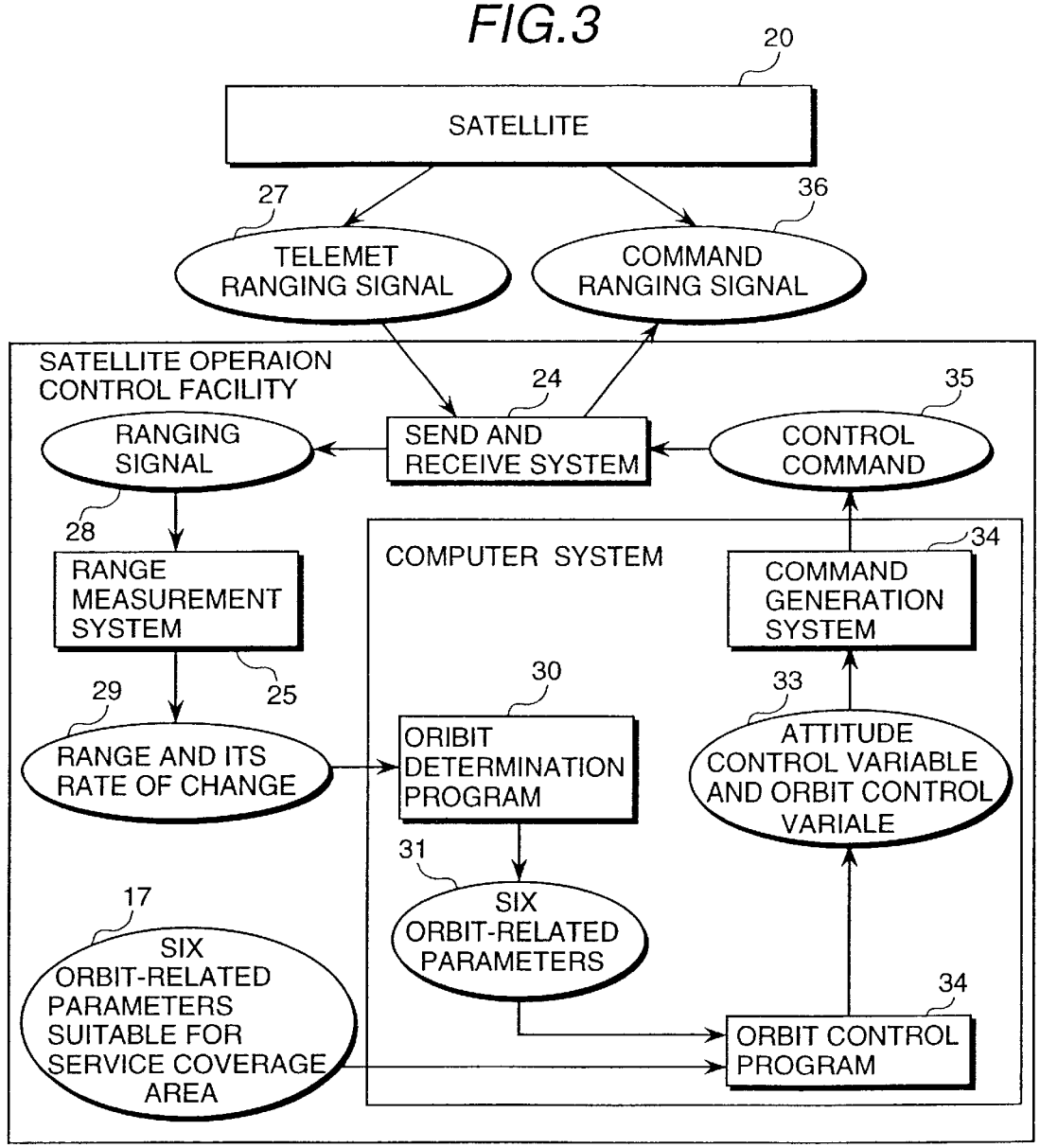
FIG. 3 is a diagram illustrating the information flow in the tasks performed in the artificial satellite operation control apparatus for orbit control of the artificial satellite.

As shown in FIG. 3, six orbit-related elements 31 of the orbit on which the satellite 20 travels are determined by the following steps: telemetry ranging signals 27 transmitted by the satellite 20 are received by the send and receive system 24 of the satellite operation control facility 18, ranging signals 28 are extracted and forwarded to the range measurement system, and a measured range and its rate of change 29 are used as input data and processed by the orbit determination program 30 in the computer system 26. By comparing the six orbit-related elements 31 obtained in this manner and the six orbit-related elements 17 suitable for the target service area as reference values, the orbit control program 32 in the computer system 26 calculates necessary attitude control values and orbit control values 33. Finally, which thrustor of the propulsion system of the satellite should be driven and how long this drive operation should last can be determined. Those results are converted into the control command 35 by the command generation program 34 in the computer system 26 and are transferred to the satellite 20 via the send and receive system 24 of the satellite operation control facility 18.

Figure 4:
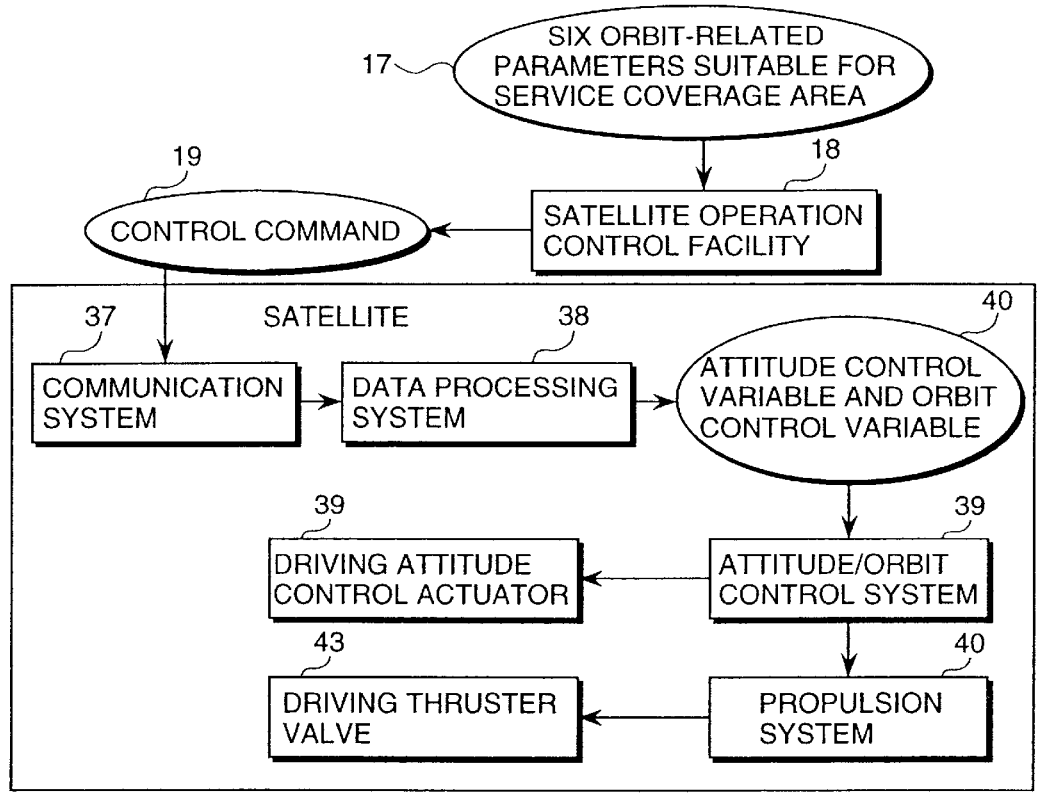
FIG. 4 is a diagram illustrating the process and information flow in the artificial satellite for orbit control of the artificial satellite.
Figure 5:
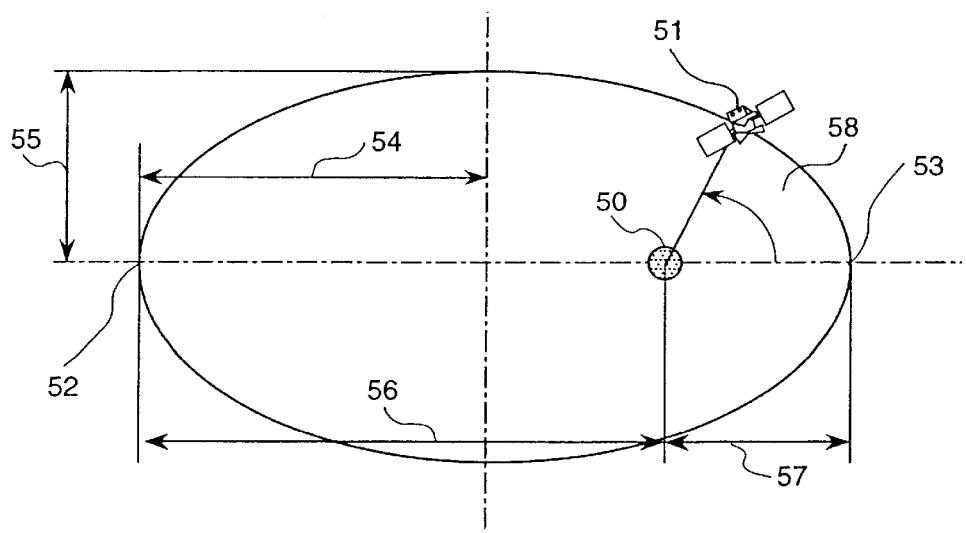
FIG. 5 is a geometrical diagram of six orbit-related parameters defining the shape of the orbit, in which the orbit is viewed in the normal direction to the orbital plane.

As shown in FIG. 4, the control command transferred to the satellite 20 is received by the communication system 37 loaded on the satellite 20 and the transferred command is interpreted by the data processing system 38. In response to the interpreted command, information related to the attitude control variable and the orbit control variable is processed by the attitude/orbit control system 39 loaded on the satellite. If necessary, by means of a change in the attitude of the satellite produced by driving the attitude control actuator 42, the thrustor of the propulsion system 40 loaded on the satellite being driven in response to the control command, the satellite 20 is finally controlled so as to trace the orbit defined by six orbit-related elements 17 suitable for the target service area. In addition, in case the satellite 20 has a receiver for GPS (Global Positioning System) or GLONASS forming the global earth observing system on board, the system may be configured so that the satellite 20 itself stores six orbit-related elements 17 suitable for the target service area and the satellite may control its orbit trajectory autonomously by using the stored parameters.

As described above, the orbit-related elements 17 suitable for the target service area determined by the algorithm shown in FIG. 1 is controlled and realized.

According to the present invention, a method for setting an orbit of the satellite required for the satellite to come in sight in the zenith direction over an extended time period and six orbit-related elements to define the orbit, and various systems for using the satellite traveling on this orbit can be provided.

In addition, according to the present invention, an orbit control system is provided for realizing orbit control of the satellite based on the six orbit-related elements so defined in the above described manner.

What is claimed is:

1. An orbit control system having an artificial satellite tracking and supervisory facility which estimates orbits of a group of flying artificial satellites;

obtains an orbit-controlled value and attitude-controlled value required by said estimated orbits and a pre-defined target controlled value; and establishes a control command corresponding to an individual controlled value and transmits said control command to said group of artificial satellites, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

2. An earth observatory system having a ground-based observatory station receiving an observatory result transmitted from an artificial satellite having earth observatory equipment, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

3. An information receiving system for receiving an information using an artificial satellite system, wherein an artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

4. A television broadcasting system using an artificial satellite, wherein said artificial satellite is placed into an orbit in which are individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

5. A satellite communication method for communicating between a group of artificial satellites which are placed into orbits in which an individual satellite orbits on an elliptical orbit so that at least one of the artificial satellites is always viewable within a pre-defined range of operational elevational angle in a zenith direction from a service area, and a satellite communication terminal, wherein the group of artificial satellites are used which are on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground; and a signal is transmitted and received among communication terminals through said artificial satellite appearing within the pre-defined range of the operational elevational angle in a zenith direction when said group of artificial satellites are used within its corresponding service area.

6. A satellite communication system at least having an artificial satellite and plural satellite communication terminals for performing satellite communication through said artificial satellite, wherein said artificial satellite is placed into an orbit in which an individual satellite orbits on an elliptical orbit so that at least one of the artificial satellites is always viewable within a pre-defined range of operational elevational angle in a zenith direction from a service area;

a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground;

at least one of said plural satellite communication terminals is located within said major service area, and other terminals are located outside said major service area and within an area from which a communication with said group of artificial satellites is enabled; and in responsive to an operational elevational angle of said group of artificial satellites viewed from a major service area of said group of artificial satellites, a relay operation is selected among either one of relay operations including a relay operation among satellite communication terminals located within said major service area, a relay operation between a satellite communication terminal located within said major service area and a satellite communication terminal located outside said major service area, and a relay operation among satellite communication terminals located outside said major service area.

7. A television program information service system for providing a television program information from a ground-based station to a mobile station through an artificial satellite, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

8. A road traffic information service system for providing a road traffic information from a ground-based station to a mobile station through an artificial satellite, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

9. A mobile telephone system for performing transmission between a mobile communication terminal and a fixed or movable telephone, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

10. A communication system for transmitting an image from a mobile station to a ground-based station through an artificial satellite, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

11. A communication system for transmitting an image from an ambulance to a paramedic center through an artificial satellite and transmitting a command from said paramedic center to said ambulance through an artificial satellite, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

12. A rescue support system for communicating an information of distressed people from a mobile communication terminal to a rescue center though an artificial satellite, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

13. A charging and accounting system for communicating various information of utility charges collected on ground to a charging and accounting center through an artificial satellite and for accounting and billing charges, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

14. An orbit control method for estimating orbits of a group of flying artificial satellites;

obtaining an orbit-controlled value and an attitude-controlled value to be required by said estimated orbits and a pre-defined target controlled value; and establishing a control command corresponding to an individual controlled value and transmitting said control command to said group of artificial satellites though an artificial satellite tracking and supervisory facility, when controlling an orbit of a group of artificial satellites, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

15. An earth observation method for observing with an earth observation apparatus installed on a group of artificial satellites, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

16. An information receiving method for receiving an information by using an artificial satellite, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

17. A television broadcasting method for broadcasting by receiving a television signal from an artificial satellite, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

18. A satellite communication method, wherein plural satellite communication terminals for performing satellite communication through a group of artificial satellites are at least provided, in which said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground;

at least one of said plural satellite communication terminals is located within said major service area, and other terminals are located outside said major service area and within an area from which a communication with said group of artificial satellites is enabled; and in responsive to an operational elevational angle of said group of artificial satellites viewed from a major service area of said group of artificial satellites, a relay operation is selected among either one of relay operations including a relay operation among satellite communication terminals located within said major service area, a relay operation between a satellite communication terminal located within said major service area and a satellite communication terminal located outside said major service area, and a relay operation among satellite communication terminals located outside said major service area.

19. A television program information service method for providing a television program information from a ground-based station to a mobile station through an artificial satellite, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

20. A road traffic information service method for providing a road traffic information from a ground-based station to a mobile station through an artificial satellite, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

21. A mobile telephone method for performing transmission between a mobile communication terminal and a fixed or movable telephone, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

22. A communication method for transmitting an image from a mobile station to a ground-based station through an artificial satellite, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

23. A communication method for transmitting an image from an ambulance to a paramedic center through an artificial satellite and transmitting a command from said paramedic center to said ambulance through an artificial satellite, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

24. A rescue support method for communicating an information of distressed people from a mobile communication terminal to a rescue center though an artificial satellite, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

25. A charging and accounting method for communicating various information of utility charges collected on ground to a charging and accounting center through an artificial satellite and for accounting and billing charge, wherein said artificial satellite is placed into an orbit in which an individual satellite orbits on an elliptical orbit so that at least one of the artificial satellites is always viewable within a pre-defined range of operational elevational angle in a zenith direction from a service area; and a group of said artificial satellites are satellites on respective different orbits obtained by combining an inclination angle and an eccentricity squared of said elliptical orbit so that a time period during which one artificial satellite of said group of said artificial satellites is viewable from ground is substantially identical to a time period during which another artificial satellite of said group of said artificial satellites is viewable from ground.

* * * * *